United States Patent [19]

Ryan et al.

[11] Patent Number: 4,627,901
[45] Date of Patent: Dec. 9, 1986

[54] SEPARATING WAX FROM HYDROCARBON MIXTURE BOILING IN THE LUBRICATING OIL RANGE

[75] Inventors: Douglas G. Ryan, Rockaway; Anthony E. Cerkanowicz, Livingston; Robert J. L. Chimenti, Short Hills; Donald J. Mintz, Summit, all of N.J.

[73] Assignee: Exxon Research and Engineering Company, Florham Park, N.J.

[21] Appl. No.: 722,160

[22] Filed: Apr. 11, 1985

[51] Int. Cl.[4] ........................ B03C 5/00; B03C 5/02
[52] U.S. Cl. ................................. 204/190; 204/188; 204/189; 204/302; 204/308; 210/748
[58] Field of Search ............... 204/188, 189, 190, 302, 204/308; 210/748

[56] References Cited

U.S. PATENT DOCUMENTS

| | | |
|---|---|---|
| 2,060,839 | 11/1936 | Waterman . |
| 2,061,197 | 11/1936 | Kiech . |
| 2,440,504 | 4/1948 | Fisher et al. . |
| 3,129,157 | 4/1964 | Lockenhoff . |
| 3,412,002 | 11/1968 | Hubby . |
| 3,489,669 | 1/1970 | Ruhnke . |
| 3,567,619 | 3/1971 | Brown . |
| 3,616,460 | 10/1971 | Watson et al. . |
| 3,799,872 | 3/1974 | Hargis et al. ........................ 204/190 |
| 4,139,441 | 2/1979 | Bose . |
| 4,193,774 | 3/1980 | Pilat ........................................ 55/10 |
| 4,194,956 | 3/1980 | Seguine ............................... 204/186 |
| 4,200,509 | 4/1980 | Seguine . |
| 4,334,987 | 6/1982 | Mamadzhanov et al. . |
| 4,435,261 | 3/1984 | Mintz et al. ........................ 204/168 |

FOREIGN PATENT DOCUMENTS 2456707 8/1976 Fed. Rep. of Germany ...... 204/188

Primary Examiner—Howard S. Williams
Attorney, Agent, or Firm—J. Simon

[57] ABSTRACT

In order to separate wax from lubricating oil, it is necessary both to introduce free excess charge which is net positive or net negative into the wax-laden oil, preferably by charge injection, and to reduce the solubility for the wax (for example by cooling the lubricating oil) sufficiently so that dissolved wax forms a dispersion of wax particles and crystals in the oil. The resulting electrophoretic effect results in wax particle agglomeration and particle size growth in the oil itself and/or on collector surfaces in contact with the charged oil. The charge injection and the wax solubility reduction such as by cooling can occur simultaneously, or one before the other in either order. Cooling can conveniently be effected wholly or in part by mixing with the oil an auto-refrigerant liquid which vaporizes to reduce the oil temperature. Ideally the auto-refrigerant liquid additionally has oil solvent properties, propane being an example of a suitable such liquid additive. The cooling can also be at least partially effected by heat exchange with a cooling fluid, for example, using a cooling jacket surrounding a separation vessel in which the wax agglomeration and growth occurs or a heat exchanger in the wax-laden oil feed to the separation vessel.

56 Claims, 15 Drawing Figures

SEPARATING WAX FROM HYDROCARBON MIXTURE BOILING IN THE LUBRICATING OIL RANGE

CROSS-REFERENCE TO RELATED APPLICATIONS

The specification of this application refers to other applications of the present assignees filed on the same day as the present application and bearing the undermentioned assignee case references:

Ser. No. 722,107
Ser. No. 722,162
Ser. No. 722,163

BACKGROUND OF THE INVENTION

This invention relates to methods and apparatus for separating dissolved wax and wax particles from a hydrocarbon oil mixture boiling in the lubricating oil range. The term "wax particles" herein means wax in any particulate form and includes wax crystals. Furthermore, throughout this specification, it is to be understood that "hydrocarbon oil mixture" and "oil mixture" both mean a hydrocarbon oil mixture boiling in the lubricating oil range.

The problems of wax in lubricating oil are very well known in the art. In the distillation of crude oil, a proportion of wax is present in cuts taken in the lubricating oil range. Some of the wax remains dissolved in the oil, whereas other fractions form a haze as the oil fraction ages at ambient temperatures. Wax in itself is in fact a good lubricant but under comparatively low temperatures such as engine cold start conditions, its presence causes the oil to be thick and viscous and as a result the engine may be hard to turn over at sufficient speed during starting. Haze manifests itself as a milky or cloudy appearance in the oil and is often caused by wax or by both wax and tiny water droplets being present in the lubricating oil. Typically a minimum of about 0.1% by volume of wax will cause some lubricating oil to look hazy. Therefore the existence of haze caused by the presence of wax crystals or particles detrimentally affects the performance of lubricating oils. It is of paramount practical importance to devise techniques for removing dissolved wax from lubricating oil in a relatively inexpensive, simple and effective manner, which techniques are also capable of implementation on an industrial scale.

DESCRIPTION OF THE PRIOR ART

Techniques have been available for many years which enable dissolved wax to be separated from lubricating oil. A well-known approach is to mix an oil solvent with the lubricating oil. "Oil solvent" as used throughout this specification refers to those solvents which when added to an oil mixture result in a lower viscosity for the solvent-oil mixture than for the oil mixture alone. This is beneficial for enhancing the settling or filtration processes used to separate the precipitated wax from the solvent oil mixture. Usually, the oil solvent will have the additional property of having a higher solubility for the oil mixture than for the wax at any given temperature, so that during chilling of the solvent-oil mixture to precipitate wax, the wax precipitation is enchanced. Liquified hydrocarbon alkanes or alkenes, ketones, toluene or other aliphatics, and light organic chlorides are examples of well known oil solvents. When the wax-laden oil is cooled, then as the temperature of the oil is reduced, different wax fractions start to come out of solution, aided by the oil solvent. Propane is an example of a preferred oil solvent because in addition to its oil solvent properties, it boils or vaporizes at typically encountered conditions of temperature and pressure in propane dewaxing processes, and this in turn leads to an auto-refrigeration effect which can be used to bring about the desired cooling, at least in part, of the wax-laden oil.

The grown wax particles and crystals are separated from the lubricating oil/oil solvent mixture, following the above described propane pretreatment, by means of a suitable mechanical filter. Rotary filters are well-known in the art for this purpose. The lubricating oil-/oil solvent mixture is brought into contact with a filter cloth, extending around the rotary filter, in one angular position of the filter and a wax cake is formed on the filter cloth. In another angular position, the wax cake is washed with a solvent to recover oil from the wax cake and in a further angular position of the rotary filter, wax is scraped from the filter cloth by a scraper blade positioned adjacent the periphery of the rotary filter. The thereby-resulting relatively wax-free cloth then rotates further into contact with the oil again to collect more wax and this process continues. Since the rate of filtration is directly related to the viscosity of the lube oil/oil solvent mixture, which is lower than that of the lube oil alone, the filtration rate is enhanced.

The wax particles need to be grown as large as possible in the oil solvent pretreatment process, in order to achieve the most effective wax separation by the rotary filters. This requires that the temperature of the wax-laden lubricating oil be reduced very gradually. If the temperature were to be reduced more rapidly, much smaller wax crystals would be produced for a given temperature drop. Therefore, the oil solvent pretreatment apparatus has to be specially designed to provide the necessary stringent operating parameters. In addition, dewaxing aids are often used to promote the wax crystallization but such dewaxing aids are comparatively expensive. The need exists, therefore, for a simple, inexpensive, and effective technique for removal of wax from lubricating oil.

It is also well known to separate wax from oil electrically. The wax-bearing oil can be pretreated by chilling to promote crystallization of dissolved wax and then the wax crystals separated electrically. A number of patents exist which relate to wax separation in this way. A representative selection is provided by U.S. Pat. Nos. 2,031,210 (Dillon et al); 2,039,636 (Dillon et al); 2,053,552 (Dillon et al); 2,054,273 (Subkow); 2,067,162 (Fisher et al); 2,086,666 (Fisher); 2,151,318 (Dillon et al); and 2,174,938 (Dillon et al). In the Subkow patent, wax-bearing oil dissolved in a suitable diluent, such as propane, is passed into a chiller in which a proportion of the propane evaporates at reduced pressure to cool the oil and cause wax to be recipitated. The resultant mixture containing precipitated wax is then forcibly pumped into a cylindrical tank containing a rotatable filter drum on which the wax deposits. This wax layer is subjected to a high potential electric field which draws occluded oil to the outer surface of the wax layer. This oil then separates from the wax layer under the influence of gravity.

A rotary wax filter is disclosed in aforesaid U.S. Pat. No. 2,031,210 (Dillon et al) in which chilling is effected in the filter itself by vaporization of propane diluent and the propane diluted waxy oil is subjected to an electric field applied between two electrode arrangements.

Each of the remaining aforesaid U.S. patents relates to different aspects of a dewaxing process in which wax-containing oil is firstly mixed with a diluent, such as liquid propane, and then passed through a refrigerator to cause precipitation of wax particles in the oil/diluent mixture, following which the wax-particle-containing oil/diluent mixture is subjected to treatment in an electric field applied between two electrodes for removal of the wax.

A number of further patents discloses dewaxing oil by initial chilling, such as by adding an auto-refrigerant diluent which may for example be liquid propane, followed by application of electrical windage or ionizing electric fields using an electrode terminating on an edge or point. Examples of such patents are U.S. Pat. Nos. 2,109,125 (Aldridge et al); 2,109,130 (Fisher); 2,109,131 (Fisher); 2,109,350 (Dillon); 2,300,283 (Fisher); 2,302,386 (Fisher); and 2,042,887 (Fisher et al).

Reference is also made to U.S. Pat. No. 1,940,654 (Stanton) which discloses petroleum oil dewaxing technique based on electrophoresis. The oil is chilled by refrigeration. In addition, it is usually necessary to dilute the wax bearing oil prior to refrigeration with naphtha or other solvent. Two possible mechanisms are described by which the technique imparts charge to the wax crystals, i.e. direct contact charging and charging by passing the crystals through a glow or brush discharge (comprising bipolar gas-phase ions).

U.S. Pat. No. 4,194,956 (Sequine) discloses a rather different dewaxing process in which wax is removed from high resistivity oils by electrofiltration, by passing the oil through interstitial spaces defined within a mass of ceramic beads, across which a non-uniform electric field is maintaind. Prior to the electrofiltration, the oil is tempered at a sufficiently cool temperature until wax nucleation occurs and crystal growth begins, and the nucleated wax crystals are grown at an appropriately cool temperature until the wax crystals are large enough to be electrostatically removed by the electrofiltration process.

Although not directly relevant to dewaxing lube oil, of some interest to the present invention are U.S. Pat. No. 3,431,617 (King) and U.S. Pat. No. 3,324,026 (Waterman et al). King uses sharply pointed projections on one electrode of a pair of oppositely charged electrodes associated with a treating chamber in an electrostatic treater for waste liquid, to concentrate the electric field at the projection tips for encouraging flocculation of impurity particles carried by the waste liquid. In another arrangement the projection tips inject charge carriers into the waste liquid and a resulting electrical current flow is established through the waste liquid between the two electrodes. The net positive charge due to the flow of positive ions in one direction exactly equals the next negative charge due to the flow of negative ions in the opposite direction. Waterman et al discloses an electric filter for removing suspended contaminants from substantially waterfree, high resistivity, oils. The contaminated oil is flowed through the pores of individual elements of porous material forming a multi-element mass filling a treating space between two electrodes which maintain a high-gradient unidirectional electric field in the treating space. Before the oil is passed through the multi-element mass, it may be subjected to electrical discharge or blast action by a plurality of relatively sharp pointed pins of one polarity facing but spaced from a member of opposite polarity.

The above-mentioned patents are a representative selection of the several known techniques for electrically separating wax from chilled oil. However, in complete contrast with the present invention, none of them employs or suggests the introduction of free excess charge which is net positive or net negative and which attaches itself to the wax dispersed phase and also causes an electric field to be induced in the wax-laden oil, whereby an electrophoretic interaction occurs which is harnessed to effect separation of the wax from the oil.

It is also remarked that known separation techniques such as described above can operate quite satisfactorily in practice, but have the disadvantage that they are not particularly effective in the case of wax particle sizes below a certain level (especially of the order of submicron-size or micron-size diameter-for example about 0.1 to 100 microns). This may be due to the fact that the electrostatic force acting on each individual particle due the applied electric field becomes insufficient, when the wax particle size becomes sufficiently small, having regard to the viscous drag forces exerted by the oil or continuous background phase (oil/diluent) and the maximum possible charge level on the individual wax particles.

One way in which electric charge introduction, mentioned above, can be achieved is by a charge injection technique, and in this regard, reference is directed to U.S. Pat. No. 4,255,777 (Kelly), assigned to the present assignees. This patent specifically discloses an electrostatic atomizing device and process for the formation of elctrostatically charged droplets having an average diameter of less than about 1 millimeter for a liquid having a low electrical conductivity. Envisaged applications of the electrostatic atomizing technique are for spraying cleaning fluid onto the surface of an article to be cleaned, for spraying agricultural liquid, such as an insecticide, onto vegetation or soil, for spraying lubricant onto bearings and gears of large industrial machinery, for surface coating an article by spraying a solution of a plastic dissolved in a non-conductive liquid or an oil based paint, to inject free excess charge into a molten plastic, glass or ceramic, and for spraying liquified plastic material for forming surface coatings. Another possible application is to produce charged droplets of liquid e.g. paint within a body of the same liquid which is in contact with a metal surface, so that the charged droplets deposit as a coating on the metal surface. Charged droplets of for example perfume could be sprayed onto oppositely charged powder e.g. talcum powder. Yet another application is the atomization of hydrocarbon fuels, for increasing combustion efficiency. However, the Kelly patent neither discloses nor suggests trying to charge a two-phase liquid comprising dispersed or suspended particles such as wax in a continuous liquid phase (such as lubricating oil) nor appreciates that the charge, introduced into the continuous liquid phase, transfers therefrom to the dispersed phase and that an electrophoretic effect occurs which causes migration of the dispersed phase in the liquid phase, not even suggests any kind of application to electrical separation.

Finally, reference is directed to U.S. Pat. No. 4,435,261 (Mintz et al), assigned to the present assignees, which discloses a technique for the free radical polymerization of liquid monomers to thermoplastic polymers. Free excess electrical charge is injected into the liquid monomer, so as to initiate polymerization of the monomer into a polymer.

SUMMARY OF THE INVENTION

The present invention relates to separating wax from a hydrocarbon oil mixture boiling in the lubricating oil range, the wax being dissolved in the oil mixture and/or forming a dispersion or suspension of wax particles or crystals in the oil mixture. One aspect of the invention is the pretreatment of the oil mixture for precipitating any dissolved wax and for effectng wax particle agglomeration and wax particle size growth, whereby the larger wax particles are of a sufficient size that they can be separated from the oil mixture by any simple or known way, such as by a mechanical filter such as a filter medium e.g. a filter screen, or a rotary filter such as a rotary drum filter. Alternatively, the pretreated wax-containing oil mixture and a wax collector surface can be brought into contact with one another so that wax particles deposit on the collection surface, for separation from the oil mixture.

For achieving the wax precipitation and growth, two method steps have to be performed. One is that free excess electric charge which is net unipolar, i.e. net positive or net negative, has to be introduced into the wax-containing oil mixture. The charge can conveniently be introduced by charge injection. The second required step is that the solubility for the wax is reduced, so as to cause dissolved wax in the oil to form a dispersion of wax particles in the oil mixture. The solubility reduction and charge introduction steps can be carried out in either order or at the same time. Specifically, both steps will usually be carried out simultaneously. Where the solubility reduction is achieved by for example cooling the solution, the cooling will cause the temperature of the solution to fall progressively until, eventually, a dispersion of precipitated wax particles will form in the oil mixture. Another possibility is to reduce the solubility for the wax in the oil mixture, initially without introduction of free excess charge, at least until wax particles just start to form in the oil mixture, and then, with or without further solubility reduction, free excess charge is introduced into the solution so as to cause the already formed wax particles to agglomerate and grow into larger wax agglomerates or particles, as will be described in more detail hereinbelow. In principle, the converse situation is possible, namely to charge the wax-containing oil mixture with free excess charge, with or without a solubility reduction, and then to complete the solubility reduction, in the absence of any further introduction of free excess charge, at least until wax particles just start to form in the oil mixture. One practical difficulty with this particular possibility is that once no further free excess charge is introduced, the free excess charge will tend to leak to earth and it would then be necessary for the solubility reduction to be sufficiently rapid that at least initial formation of wax particles has occurred before a significant proportion of the charge has leaked away. In practice this result may be difficult to achieve. However, where for example the introduced charge has a pulsed periodic waveform of relatively high frequency comprising a pulse of one polarity and a zero amplitude portion over each cycle of the waveform, then wax particle formation followed by growth/agglomeration will still occur even when a zero amplitude portion of the waveform concides with the initial crystal formation.

In order to promote precipitation of dissolved wax as wax particles, an oil solvent may be added to the oil mixture. It is desirable that the oil solvent liquid be an "auto-refrigerant" liquid (such as liquified propane), by which is meant that the liquid at least partially vaporizes from the combined oil solvent liquid and hydrocarbon oil mixture, so as to reduce the temperature of the oil mixture. This in some instances obviates the need for a refrigeration or chiller unit in which the oil mixture is cooled by indirect heat exchange with a cooling medium, or in others reduces the refrigeration capacity requirement of the refrigeration or chiller unit.

Other ways exist to alter the solubility of the wax in the oil mixture. To wax-containing oil mixture already diluted with an oil solvent liquid can be added a liquid additive which alters the chemical or physical state of the solvent by chemical reaction between the additive and solvent or, where the additive is a solvent absorber, by the selective absorption of the solvent by the additive. A second example is to utilize the vapor pressure of the oil mixture such as by venting or drawing vaccum. Alternatively, oil solvent vapor in the gas or vapor atmosphere above a body of oil solvent/lube oil can be selectively removed from the atmosphere to bring about wax precipitation.

It is to be noted that wax and lube oil are chemically similar but have differing molecular weights. To facilitate precipitation of dissolved wax, an additive may be used such as a high molecular weight hydrocarbon, containing an amine group.

Another aspect of the invention is less concerned with promoting wax crystal growth to form large wax crystals, before those crystals are separated, e.g. by mechanical filtering, from the hydrocarbon oil mixture. Instead, wax precipitation is promoted followed by deposition of charged wax particles and crystals, irrespective of size, on a collector surface. This effect will occur predominantly where a short wax particle migration path to the collector surface exists. For example, in one embodiment, a separation vessel containing charged, chilled, wax-bearing lube oil contains a bed of densely packed collector beads of low electrical conductivity, so that the distance between each initially charged wax particle or crystal and the nearest bead surface in the path of the migrating particle will on average be very small (less than the interstitial dimensions between the beads).

According to the invention, then, from this second aspect there is provided a method of separating dissolved wax from a hydrocarbon oil mixture boiling in the lubricating oil range, which comprises the steps of reducing the solubility for the dissolved wax to cause dissolved wax in the oil mixture to form a dispersion of wax particles and introducing free excess charge which is net unipolar into the oil mixture, and which method further comprises bringing the charged oil mixture and a collector surface into contact with one another so that charged wax particles in the oil mixture collect on the collector surface under the effect of the introduced free excess charge.

The electrophoretic migration arises due to an interaction which occurs between an electric field, which is self-induced in the oil mixture itself as a result of the introduced electric charge, and the charge on the wax dispersed phase. Free excess charge introduced into the wax/water containing oil mixture is positive or negative ions which, initially, are free to move through the continuous oil mixture phase. The continuous phase acts as a medium through which volumetric distribution of the introduced charge occurs, so as to establish the induced electric field in the mixture. The next step in the electrical separation process involves allowing the migrating dispersed wax phase to form into accumulations of charged wax on one or more collector surface(s) in contact with the hydrocarbon mixture.

It is stressed that the electric field is the result not of any voltage applied to any external electrodes so as to set up an electric field between those electrodes, but rather arises from the total introduced or injected charge distribution in the oil mixture and on the wax suspension and the collector surface regions where separation occurs.

A particularly convenient way of recovering the wax is to allow the migrating wax to form accumulations of charged dispersed phase on one or more collector surfaces inside a separation vessel containing the oil mixture.

The basis for the effective separation that can be achieved when putting this invention into effect is believed by the inventors to be as follows. The first step in the process is the production of an excess (i.e. net unipolar—positive or negative) charge density in the otherwise electrically-neutral oil mixture. Several techniques are available to produce a transient or steady-excess charge density. Broadly speaking, such methods fall into two general categories, namely: (1) injection of excess charge across the interface or boundary which confines the wax contaminated oil mixture, and (2) volumetric charge introduction techniques into the bulk of the oil mixture. Examples of the first category include electron beam and high energy particles irradiation, photo-emission and charge transport by a moving fluid. Another example is charge injection as taught in the aforesaid Kelly U.S. Pat. No. 4,255,777, the contents of which are expressly incorporated herein and which discloses charge injection solely or predominantly by field emission. Field emission (e.g. as disclosed in the aforesaid Kelly patent), electron beam irradiation and photoemission are all examples of electron emission. Examples of the second category are photoionization of either or both of the wax suspension and the oil mixture and secondary ionization by thermalization of high energy particle irradiation of the wax-contaminated oil mixture. These examples all involve ionic dissociation within the oil mixture.

It is necessary that there be an excess of free charge in the oil mixture in the sense of a sufficient abundance that an effective migration of wax will occur. Typically, the density of the free electrons would be of the order of $10^{16}$ charges per m$^3$. A lower limit would be about $1 \times 10^{10}$ charges per m$^3$. A typical preferred range of free charge density is about $1 \times 10^{13}$ to $1 \times 10^{19}$ charges per m$^3$ or even higher, for providing effective migration of the wax.

The charge introduced into any wax contaminated oil mixture stream to be clarified must be net negative or net positive. However, providing this requirement is met, then it is equally possible to introduce the excess charge using two streams of opposite but unequal levels of charge or alternating net positive and net negative streams for the purposes of wax agglomeration prior to collection, in the first case, or multilayer precipitation in the second case (e.g., collecting a net negative layer then a net positive layer, and so forth, of the wax/water dispersed phase).

The second step in the process is the transference of the major portion of the excess charge to the wax contaminants in the liquid. In a preferred way of performing the invention in which a charge injector, such as disclosed in the aforesaid U.S. Pat. No. 4,255,777, is used for introducing net unipolar free excess charge into a wax contaminant-laden lube oil stream (with or without added oil solvent), the stream issues from the charge injector as a continuous stream or spray through a gas or vapor space and enters a separation vessel where a body of charged oil mixture is collected. The gas or vapor space is provided to enable the charged fluid to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective removal of the wax contaminant whether the contaminated oil is sprayed by the charge injector or simply issues as a continuous stream into the separation vessel, particularly at relatively high velocity throughputs in the charge injector. However, when the wax contaminated oil is sprayed, the individual oil droplets are in general separated from one another and this can be important where lower throughput velocities, closer to the drift velocity of the individual charges, are employed. It is, however, remarked that it is important that there be no contact between the charged spray or stream passing through the gas or vapor space and any surrounding wall electrically connecting the separation vessel wall to the charge injector, in order to avoid charge dissipation. Suitably, the gas or vapor space is enclosed and a purge gas, e.g., nitrogen, circulated through the space to avoid any risk of explosion or chemical reaction. In addition, the purge gas helps to obtain uniform separation results irrespective of changes in ambient conditions, especially humidity, which if present could affect the rate of depletion of charge. In the absence of any such gap, reduced separation efficiencies will result. According to a development, the gas or vapor space is pressurized which can maintain a satisfactory throughput rate in the separation vessel even for rather viscous oils and can increase the throughput rate for less viscous oils.

In the separation region, by whatever means the free excess charge is introduced into the oil mixture, it is assumed that the excess charge density exceeds the oil mixture background charge density (i.e. the density of bipolar charge carriers which are intrinsic to the oil mixture and which result in the conductivity of the oil mixture); then the induced electric field in the separation region caused by the excess charge density will act on the individual charge carriers and drive them to the boundaries of the hydrocarbon oil mixture. Some of the charge will be intercepted by the wax particles and/or droplets as the case may be and the wax particles/water droplets will thereby become charged. The interaction which then occurs between the charged wax/water and the induced electric field causes the dispersed wax/water to migrate towards the boundaries of the oil mixture.

In the case of the first aspect of the invention referred to above, wax crystal growth arises as a result of migrating wax crystals colliding with one another while in the oil mixture and sticking together or agglomerating to form larger wax crystals. This effect occurs predominantly where the mean migration path length for the wax particles is large compared with the mean spacing between the individual wax partices. However, where short migration paths exist, most wax particles on average will reach a collector surface without colliding en route with other migrating wax particles, so that wax particle deposition and agglomeration occurs on the collector surfaces. In practice, both wax particle agglomeration within the oil mixture and wax particle deposition on one or more collector surfaces, will occur in all embodiments of the invention, but different embodiments may tend to utilise predominantly the one phenomenon or the other one.

The agglomerated wax needs to be removed or separated from the oil mixture. As already mentioned, when large wax crystals have been grown, these can be separated from the oil by mechanical filtering, for example using a filter medium or filter drum. Where the wax particles are deposited on one or more collector surfaces, periodic cleaning of the collector surfaces by backflushing, solvent washing, heating, and other techniques which are well-known to those in the art can be used. This would be appropriate for collector beads for example. For a drum collector surface or other moving surface, the wax can be scraped off by a stationary scraper blade.

It is to be noted that when using a charge injector to introduce the net unipolar free excess charge, it is important that the stream velocity through the charge injector is high enough to transport the charged stream away from the electrode region of the charge injector. Ideally, the stream velocity needs to exceed the drift velocity relative to the liquid of the individual charges induced by the electric field produced by the charge injector electrodes. On the other hand, for example where a separation vessel is used in which wax agglomeration takes place, the wax-laden oil mixture needs to remain in the separation vessel long enough to enable adequate wax contaminant to be collected and separated from the oil mixture. This generally requires a comparatively long residence time in the separation vessel and therefore a much lower velocity throughput in the separation vessel than in the charge injector. Typical values for the throughput velocities in the charge injector and separation vessel are 1 m/sec and 0.05 to 1 cm/sec, respectively. In another embodiment the internal cross-sectional diameters of the separation vessel and the injector orifice diameter are for example 5 to 10 cm and 0.025 cm, respectively. These are purely exemplary and have no limiting character.

It is to be noted that either "batch" or "continuous" electrical treatment of the oil mixture can be effected. In batch treatment a quantity of the oil mixture to be treated is, suitably, introduced into the separation vessel, and after completion of the treatment, the collected wax is recovered in any suitable way, such as described above. Afterwards, the clarified oil mixture is discharged from the separation vessel (where the vessel contains packed beads on which the wax is collected) and then the next batch introduced into the separation vessel for treatment. Alternatively, where there are no beads in the separation vessel, large wax crystal agglomerates are grown due to the introduced free excess charge, and then the separation vessel contents discharged to a downstream filtration device for removing the wax crystal agglomerates. In a modified form of batch treatment, the oil mixture is recycled through the separation vessel in the presence of both cooling and charging until the required level of clarification of the oil mixture or wax agglomerate growth is achieved. In the "continuous" wax recovery process, the oil mixture is continuously passed through the successive stages of the wax removal process.

With the present invention, it is possible to provide an apparatus and method for the effective separation from lube oil of not only wax particles where the mean wax particle size is very small (e.g. of the order of 0.1 micron to 1 mm in diameter) but also of dissolved wax, due to the cooling or chilling with or without oil solvent.

The wax separation apparatus can be made to be simple in construction and reliable in operation, whilst a contaminant separation method can be provided which is simple to put into effect. With the invention, it is possible to attain a high level of purity of the clarified oil mixture.

Preferred oil solvents for separating wax from a hydrocarbon oil mixture include liquid propane or any liquid hexane, alkane or alkene whose molecular weight is between 16 and 114, or any other oil solvent whose electrical conductivity is less than about $10^{-8}$ (ohm . m)$^{-1}$. Preferably, the temperature of the wax-containing oil mixture is in the range 140° F. to 200° F. Before it is mixed with the oil solvent liquid whose temperature is in the range of 60° F. to 200° F. These temperature ranges help to ensure that the oil solvent dissolves thoroughly and readily in the oil mixture.

One preferred way of precipitating dissolved wax from lube oil would be to cool a mixture of, say, propane and waxy oil to its cloud point, and then add a second solvent say methyl ethyl ketone (MEK), to the propane/wax/oil solution, which second solvent lowers the solubility of the wax in the solution. The MEK will cause wax to come out of solution with no further cooling. Finally, charge is injected to produce wax particle agglomeration and growth.

One preferred arrangement of apparatus suitable for separating wax from the oil mixture comprises a separation vessel with collector surfaces inside it as has already been referred to above. The collector surfaces comprise a bed of densely packed collector beads of low electrical conductivity material, e.g. glass or ceramic beads, to which the charged wax particles migrate and deposit. In another embodiment, however, a quantity of the charged wax-containing oil mixture is maintained in contact with a moving collector surfaces so that the wax deposits on said collector surface and is transported on said moving collector surface from said quantity of charged oil mixture. Conveniently, the wax transported on the moving collector surface from said quantity of charged oil mixture is scraped off the collector surface by a stationary scraper. The collector surface may be an endless surface, e.g. the outer cylindrical surface of a drum continuously rotating about its central longitudinal axis, which is continuously moving so that the surface moves into contact with said quantity of charged oil mixture to collect a deposit of wax, transports the wax to a location where the wax deposit is mechanically substantially removed, for example by being scraped from the surface, and the thereby cleaned surface returns for contact again with said quantity of charged oil mixture. Suitably, the quantity of charged wax-laden oil mixture is contained in a trough and the moving collector surface is partially submerged in the charged oil mixture in the trough.

In each of the above described arrangements, the waxy oil mixture may be precooled in a heat exchanger after said auto-refrigerant liquid is added but before it vaporizes. The heat exchanger may provide heat exchange between the waxy oil mixture and a cooling fluid, which can itself be clarified oil mixture resulting from the treatment process followed by removal of the oil solvent. The vaporization of the propane or other vaporizable oil solvent may take place in a flash drum, after which the chilled oil mixture leaving the flash drum is passed through the charge injector.

Another embodiment of the present invention concerns a batch chiller plant. One form of known batch chillers comprises a container vessel, normally cylindrical or spherical in shape, containing a quantity of propane-diluted waxy oil filling the container vessel to about half its internal capacity. Propane vapor is withdrawn from the top of the container vessel and make-up propane is sprayed, from a series of spray nozzles in a distributor ring or header inside the container vessel, onto the boiling propane/oil mixture in the container vessel to maintain a substantially constant liquid level as propane boils off. Initially, the temperature of the propane/oil mixture is above the cloud point of the dissolved wax in the oil, but as propane continues to boil off and is replenished by fresh refrigerated propane from the header, the temperature in the batch chiller gradually reduces. This gradual reduction in temperature promotes growth of large wax crystals which are then removed from the oil by passing the waxy oil/propane mixture into a rotary drum filter. This known batch chiller can easily be modified to provide an embodiment of the invention by replacing each spray nozzle of the header with a charge injector and installing a grid electrode, connected in the electrical circuit of the charge injectors, inside the container vessel below the level of the propane/oil mixture. The charge injection results in enhanced wax crystal growth so that filter rates are substantially increased with or without dewaxing aid, or so that a simpler filter device than the conventionally used filter drums can be used to achieve the same overall level of wax removal.

The description in the present specification refers throughout to the separation of wax from lubricating oil, which is the objective of the present invention. It will of course be understood that the invention is not selective for removing only wax from lubricating oil, but will also be effective for separating other contaminant particles such as grit, catalyst fines, asphaltene particles, oxide scale, corrosion scale and other corrosion products, coke fines and the like which may also be present with the wax either singularly or in some combination.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
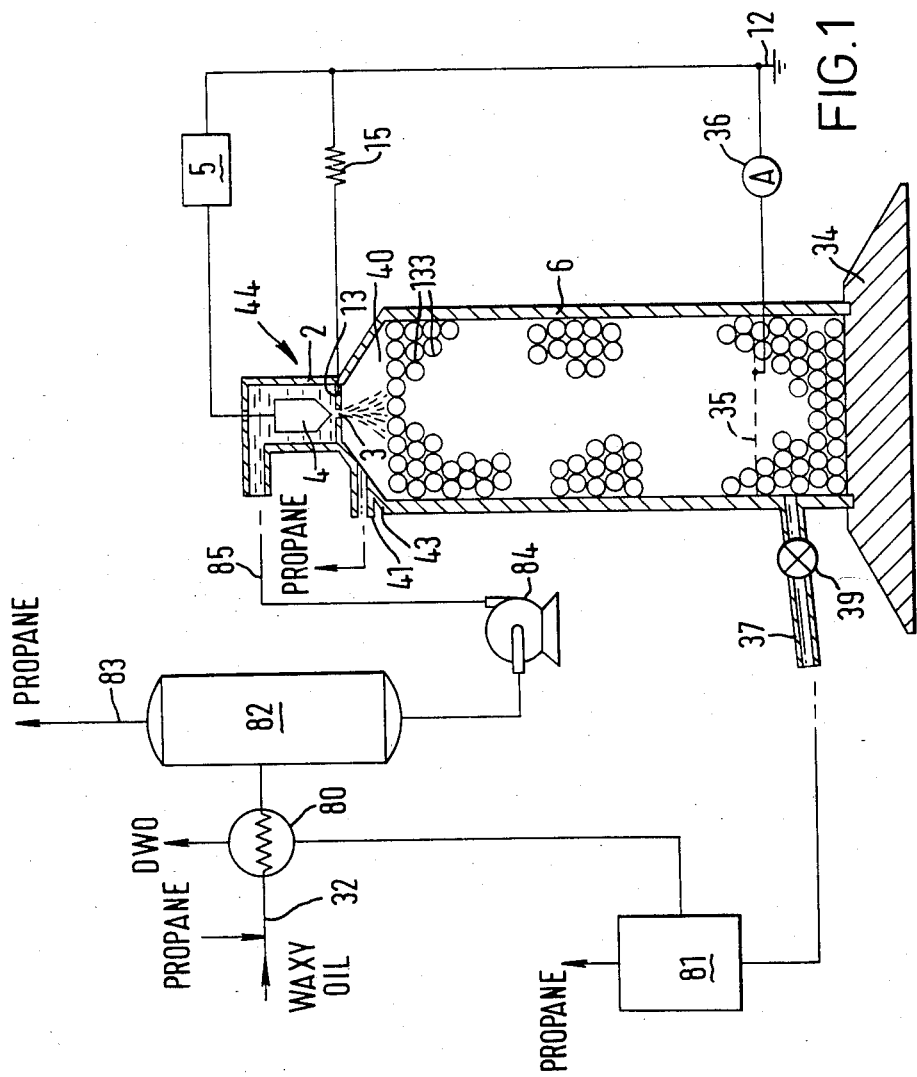
FIG. 1 is a diagrammatic side view of a first embodiment of the invention for electrically separating wax from lube oil using a bead separator, shown in vertical section.

Referring to FIG. 1, there is diagrammatically illustrated a first embodiment of the invention for separating wax from wax-laden lubricating oil which is introduced along line 32. The oil may have been previously partially dewaxed. The waxy oil feed to be treated typically contains dissolved wax, and also a proportion of wax particles and crystals, all of which would contribute detrimentally to the oil performance, especially under engine cold start conditions, if they were not removed.

Liquid propane at a temperature of 130° F.± about 70° F. is added to waxy oil at a temperature of 160° F.± about 40° F. in line 32, those temperature ranges being preferred in order to ensure proper mixing of the propane and waxy oil. It is to be understood, however, that the temperature ranges quoted are purely exemplary and have no limiting character. The propane acts as an oil solvent. The dilution ratio of waxy oil/propane solvent may be almost 1.0/3.0 or as required. The diluted waxy oil/propane mixture is precooled by indirect heat exchange in a precooler 80 with cold dewaxed oil (DWO) from propane recovery unit 81 and is then flashed across a single valve in flash drum 82, where sufficient propane vaporizes to reduce the temperature of the wax-laden oil/propane slurry further to the desired dewaxing temperature (dewaxed oil pour point minus "spread") which typically might be −30° C. The propane vapor is separated from the slurry in flash drum 82 and leaves the drum along line 83 for recycling to compression. The cooling brought about in the precooler 80 and by the auto-refrigeration effect occurring in the flash drum 82, coupled with the lesser solubility of liquid propane to wax causes dissolved wax to solidify and crystallize and form a precipitate preferentially in the lube oil/propane solvent.

The slurry in the flash drum 82 is pumped by pump 84 from the bottom of the flash drum along line 85 which leads to a charge injector 44 which, in this example, is constructed in accordance with the teaching of the aforesaid U.S. Pat. No. 4,255,777, (the contents of which are expressly incorporated herein by reference). Nevertheless, the charge injector 44 will now be briefly described. It essentially comprises an upright, suitably cylindrical, chamber 2 through which the waxy lube oil passes, having a bottom wall 13 with a central opening or orifice 3, and a sharply-pointed electrode 4 positioned inside the charge injector chamber and electrically connected to a high voltage power supply 5, the tip of the electrode 4 being located closely adjacent to, and in axial alignment with, the opening 3. The chamber bottom wall 13 serves as a second electrode which is maintained at a lower voltage, relative to earth, than pointed electrode 4, by means of a connection to earth 12, which can be a direct connection or, as shown, through a resistance element 15. Free excess charge is injected from the pointed tip of electrode 4, by the electrode pair 4, 13, into the mixture of wax-laden oil and propane, which issues through the orifice 3 and streams or sprays, through vapor space 40, into a separation vessel or reservoir 6 which is located below the charge injector 1. The vapor space 40 is shown as being enclosed by a frustro-conical cap 43 of the separation vessel on which the charge injector body is mounted, and propane vapor in vapor space 40 formed by vaporization of propane solvent in the lube oil is vented or recovered through pipe 41 extending through the wall of cap 43. The stream issuing downwardly through opening 3 may break up from a stream into a spray at a short distance below the opening 3, depending on the charging potential of the charge injector, but the existence of a stream or spray is not critical to the effective operation of the wax separation apparatus. The propane vapor purges the vapor space 40 of air which is desirable to avoid risk of explosion or chemical reaction. Where other oil solvent liquids are used which do not vaporized under the prevailing operating conditions, e.g. liquid hexane, preferably a purge gas such as nitrogen is circulated through the vapor space 40. This would require a second pipe to be provided extending through the wall of cap 43, so that that pipe could serve as the purge gas supply pipe and pipe 41 would be the purge gas outlet pipe. Where hexane for example is used instead of propane, flash drum 82 would be inappropriate as hexane would not have auto-refrigerant properties and a high capacity refrigerator would be employed in place of precooler 80. Another possibility is for space 40 to be an air space in communication with the ambient atmosphere, but such an arrangement is satisfactory only in situations where there is no risk of explosion or unwanted chemical reaction.

The injector 1 injects free charge of single polarity (positive or negative) into the waxy oil/propane stream and this stream issues from the injector downwardly through the space 40 onto a bed of densely-packed beds 33, made of glass, ceramic or other material of low electrical conductivity, which fill substantially the entire inside space of vessel 6 which conveniently is an upright, preferably cylindrical, glass columnar vessel supported on a base stand 34. A metal screen or gauze 35 to which a wire is attached and which is grounded through an ammeter 36 collects the charge carried by the oil/propane in the separation vessel. The screen 35 is shown with beads 133 above and below it, but instead the screen could serve as a supporting screen with the beads positioned on top of it, only. The ammeter provides a measure of the charging rate and, with the oil/propane flow rate, the charge density which is useful in determining the operating parameters of the charge injector, and completes the electrical circuit for the injected charge. An outlet 37 is provided in the wall of the vessel at a location below the top of the bed of glass beads 133, and preferably close to the bottom on the separation vessel. The outlet pipe 37 is directed at a shallow angle below the horizontal and discharges into a propane recovery unit, schematically depicted at 81. A controllable valve 39 in pipe 37 is periodically opened to release clarified oil/propane mixture from the bottom region of vessel 6 into the propane recovery unit 81 or is set to define a given flowrate for the discharged oil/propane mixture.

In operation, with valve 39 closed or with valve 39 at a selected setting and with already clarified oil/propane mixture covering the beads 133, wax-laden oil to be treated is fed along line 32, combined with propane solvent, precooled in precooler 80, chilled further to dewaxing temperature in flash drum 82, and then pumped by pump 84 along line 85 to charge injector 44. In the charge injector, excess charge of one polarity is injected into the stream of waxy oil/propane. The charged mixture flows over the bed of beads 133 and charged mixture already in vessel 6. Under suitable conditions of pressure, temperature etc., the propane solvent will partially vaporize and vent or be recovered through pipe 44, producing an auto-refrigeration effect which lowers the temperature in the separation vessel still further. This effect is desirable, because it tends to cause any remaining traces of dissolved wax to precipitate in the oil as wax particles or crystals and therefore enhances the precipitation effect brought about by the lower solubility to wax of the liquid propane coupled with the auto-refrigeration effect occurring in the flash drum.

The electric charge injected into the waxy oil/propane solvent mixture becomes attached to the wax particles (or crystals) which are made up of the wax particles which were present in the untreated wax-laden oil feed, the precipitated wax particles arising from the lower solubility to wax of the added liquid propane and the wax precipitation brought about by the precooling and by the auto-refrigeration effect in the flash drum and in the separation vessel 6. Concomitant with the wax particles becoming charged, a resulting induced electric field is established within the oily mixture in the separation vessel. The interaction between the self-induced electric field and the charged wax particles produces an electrophoretic field which causes the wax particles to migrate generally towards the boundaries of the charged oily mixture.

Preferably, as shown, the level of oily mixture in vessel 6 just covers the top layer of beads, in order to keep the wax migration path length to the nearest glass beads to a minimum, but this is not essential. Migration of the wax then occurs within the oily mixture in the separation vessel towards the inside wall surfaces of the vessel 6, but the migrating wax particles encounter the outer surfaces of the beads generally before reaching the vessel wall surfaces and so become deposited principally on the beads. The clarity of the oil mixture increases towards the bottom of vessel 6, and clarified oil/propane is removed through outlet pipe 37, through valve 39, and led to the propane recovery unit 81 from where the clarified lubricating oil is passed through precooler 80 and then discharged. The propane recovered in recovery unit 81 may be recycled for adding to the waxy oil feed in line 32.

The clarified oil/propane can be periodically released using valve 39, while ensuring that the wax-laden oil/propane mixture level in separation vessel 6 never reaches the charge injector. Alternatively, the clarified oil/propane may be continuously run off at a rate controlled by the setting of valve 39 and the feed of wax-laden oil/propane solvent to the charge injector regulated manually or automatically to maintain the oil level just covering the beads. From time to time, it may be necessary to replace beads 133 with new ones or to remove the soiled beads, clean them and then reintroduce them to vessel 6. Alternatively, the beads may be regenerated or cleaned in situ. Various known techniques may be used for this purpose and need not be further described herein.

Figure 2:
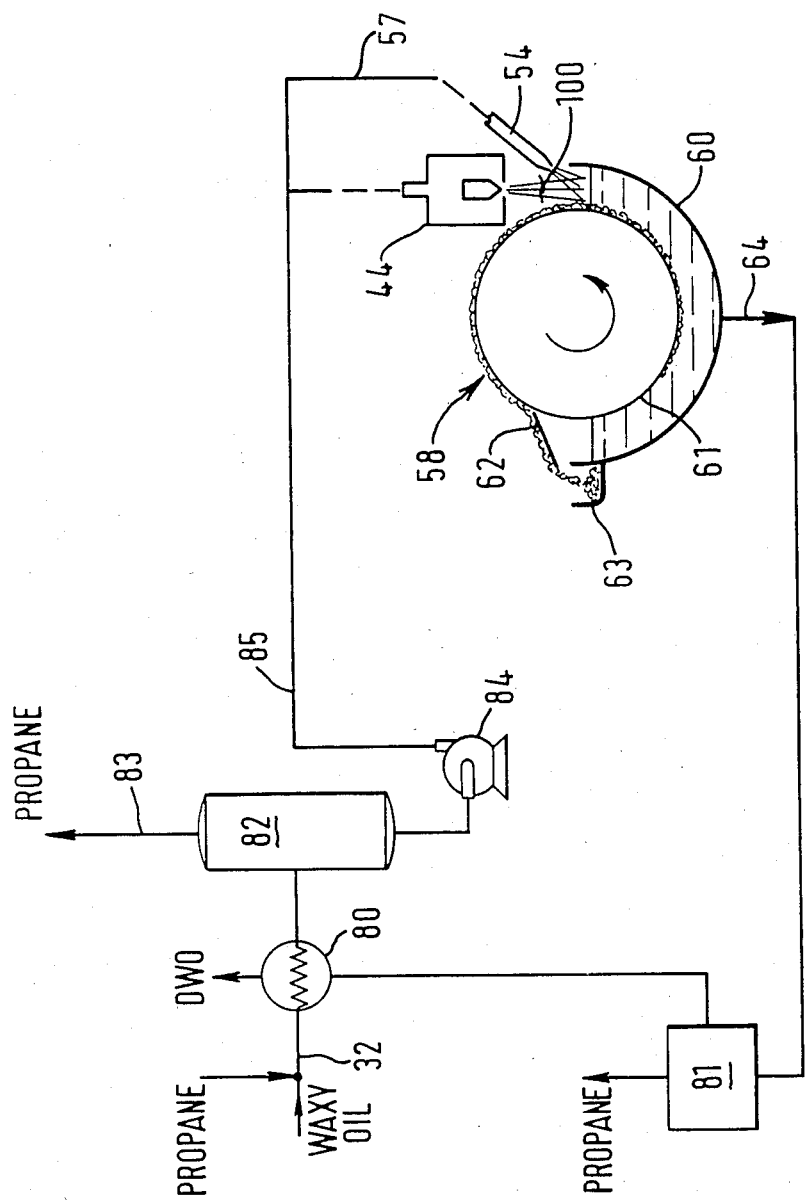
FIG. 2 is a corresponding view of a second embodiment, employing a drum separator for the removal of charged wax.

A second embodiment, using a drum separator instead of a bead separator as in FIG. 1, is depicted in FIG. 2. Chilled waxy oil/propane slurry from flash drum 82 is pumped, by pump 84, along line 85 to charge injector 44 which is of the same construction as the charge injector 44 of FIG. 1.

Positioned below the charge injector is a drum separator 58 which comprises a part-cylindrical trough 60, into which the charged waxy oil/propane slurry from the charge injector is discharged, through a gas or vapor space 100, and a rotary wax collector drum 61 which is arranged inside the trough, coaxially thereto, leaving a comparatively small radial gap between the drum surface and the inside, part-cylindrical surface of the trough. The drum surface is made of electrically conductive or non-conductive material (e.g. metal, glass or other solid material) and serves as a collector surface for wax. A wax scraper blade 62 is positioned alongside the drum surface for scraping wax off the drum collector surface and into a wax receptacle 63 or wax conveyor. A line 64 for dewaxed oil/propane mixture leads from the bottom of trough 60 to the propane recovery unit 81.

The gas or vapor space 100 provides the same function as the gas or vapor space 40 in the FIG. 1 embodiment and similar comments to those made hereinabove in connection with those embodiments will equally apply to gas or vapor space 100. However, it is preferred not only to enclose space 100 but also to enshroud the entire exposed portion of the drum 61 above the level of the oil/propane slurry in the trough 60.

It will be noted that in the illustrated embodiment a bypass line 57 diverts a proportion of the uncharged waxy oil/solvent slurry away from the charge injector and introduces the diverted proportion directly, through delivery pipe 54 and gas or vapor space 100, into the trough 60 where the uncharged slurry mixes with the charged slurry so that the charge becomes uniformly distributed on the wax particles in the slurry in the separator trough. The reason for this arrangement is that there is a practical limitation on the throughput which any given charge injector can handle and in order to achieve large scale dewaxing without for example having to use several charge injectors connected in parallel, the bypass line arrangement shown in FIG. 2 is advantageous.

In operation, wax-laden oil to be treated is fed along line 32, combined with propane solvent, precooled in precooler 80, chilled further to dewaxing temperature in flash drum 82, and then divided into two chilled streams, one of which passes through charge injector 44 and the other flows along bypass line 57. The chilling causes dissolved wax in the wax-laden oil to precipitate as wax particles and crystals. This precipitation effect is enhanced by the lower solubility for wax of the introduced propane which dissolves preferentially in the continuous oil phase. The charged and uncharged slurries are directed, through gas or vapor space 100, into the trough 60 of drum separator 58. The collector drum 61 is rotated in the direction indicated by the arrow. The electrophoretic force which is set up in the waxy oil/propane solvent slurry in the radial gap between trough 60 and drum 61 causes wax particles to migrate to the drum surface and become attached thereto by electrical attraction and physical adhesion. In this way, wax collecting on the drum surface is carried upwardly by the rotating drum out of the charged slurry in the trough and conveyed to a location at which the scraper blade 62 acts to scrape the wax off the drum surface. The wax removed in this way is collected in any convenient way such as by a wax conveyor although, for simplicity in FIG. 1, wax receptacle 63 is shown which is periodically emptied. The relatively clean drum surface remaining after the wax has been scraped off then re-enters the charged slurry in the trough 60, with further rotation of drum 61, and then further wax starts to deposit on that surface. It is to be noted that the drum only needs to rotate comparatively slowly (e.g. 0.1 to 5 r.p.m.) in order that a sufficiently thick layer of wax can be deposited before the wax layer reaches the location of the scraper blade 62. The charged slurry in the upper region contains a relatively high concentration of wax (similar to that of the charged slurry delivered by charge injector 44), whereas the oil/propane mixture in the lower region of the trough 60 is comparatively wax-free. This substantially wax-free mixture, which contains a proportion of propane, is tapped off from the trough, periodically or continuously, along line 64 which leads to propane recovery unit 81. Suitable propane recovery units are well known in the art and need not be further described herein. The propane-free, dewaxed oil is then passed through precooler 80 before being discharged.

One possible modification to the FIG. 2 embodiment is to direct uncharged propane onto the separator drum 61 of the separator 58 where the propane mixes with charged chilled waxy oil, which may be diluted with propane (instead of introducing all of the propane into the uncharged waxy oil feed). Another modification is to direct uncharged chilled waxy oil, which may be diluted with propane, onto the drum 61 while simultaneously directing charged propane or charged wax-free oil at the drum 61. Corresponding modifications could be effected to the FIG. 1 embodiment, with the charged and uncharged streams separately directed into the separation vessel 6.

Figure 3:
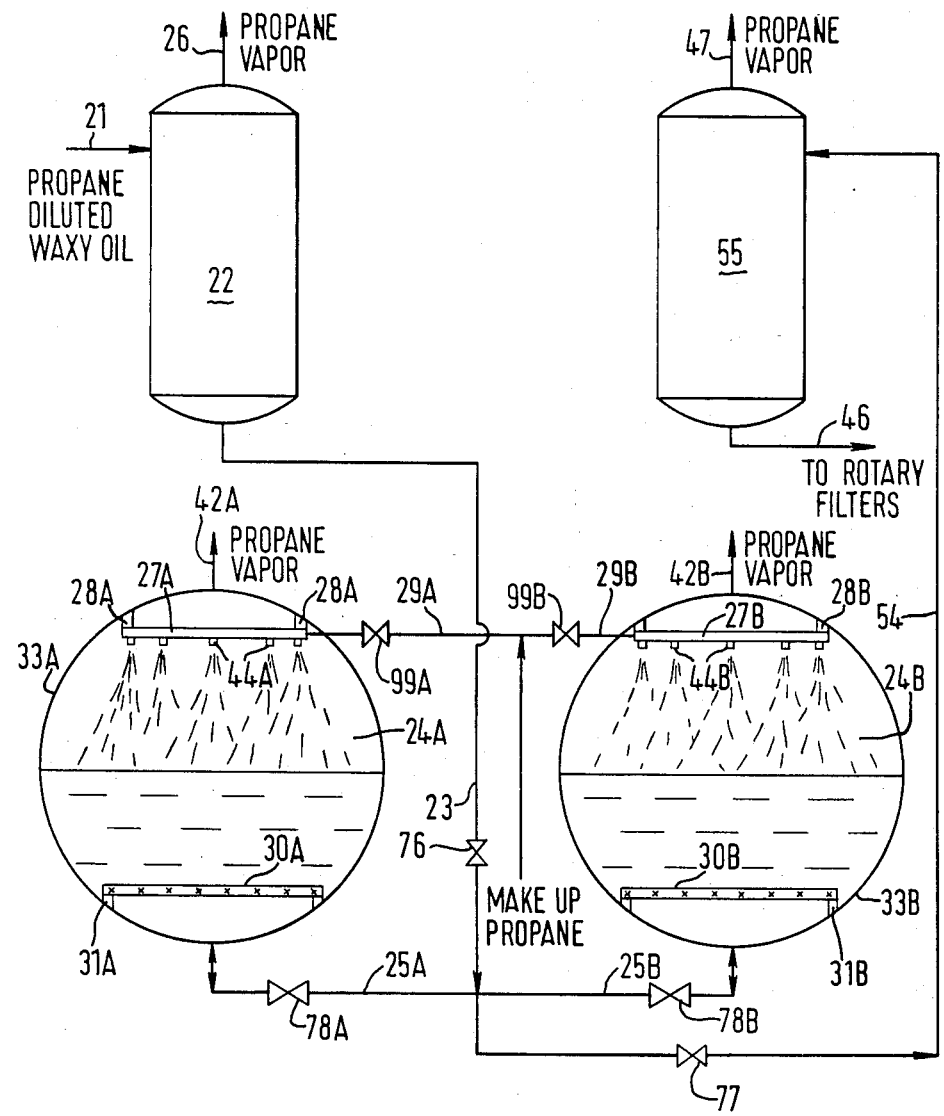
FIG. 3 is a schematic side view of a third embodiment employing batch chillers of essentially known construction, but modified to include electrical charge injectors.

Referring now to FIG. 3, there is shown, diagrammatically, one form of batch treatment plant which embodies a modification to a known kind of wax separation apparatus and represents a relatively inexpensive, simple and effective way of implementing the present invention. Liquid propane solvent at a temperature of typically 80° F. to 200° F. is added to waxy lube oil from tankage at a temperature of typically 140° F. to 200° F. and the propane-diluted oil feed is precooled in a precooler (not shown) to a temperature (about 80° F.) above the cloud point for the oil-solvent mixture (i.e., the temperature at which wax particles start to come out of solution). The propane-diluted, precooled, waxy oil feed is conveyed along line 21 and introduced into a feed drum 22 in which a quantity of propane-diluted waxy oil is stored, from which propane-diluted waxy oil is fed to a minimum of two batch chillers. In the illustrated embodiment just two batch chillers 24A, 24B are used. In embodiments having more than two chillers, the chillers are arranged into two groups with the chillers of each group interconnected. In this way, a batch of propane/waxy oil can be treated in one batch chiller (or group) while the other one is emptied and re-filled and vice versa so that in effect the facilities upstream and downstream of the batch chilling can be operated continuously. The following desumption applies to batch chiller 24A and its associated pipework and valves but it will be appreciated that the description applies equally to the other batch chiller 24B and its associated equipment by substitution of the suffix "B" for "A".

Propane-diluted waxy oil is fed from feed drum 22 along feed line 23 followed by fill/dump line 25A to batch chiller 24A. Some of the dissolved liquid propane in feed drum 22 vaporizes and propane vapor is conveyed away from the drum along line 26. Only a small temperature drop normally occurs in feed drum 22, in order that the temperature of the propane/waxy oil entering the batch chiller 24 remains near the cloud point of the oil-solvent mixture.

In this example, batch chiller 24A comprises a spherical container vessel 33A having an inlet connection at the bottom to which the fill/dump line 25A is connected. The diameter of the container vessel is typically about 25 feet. Inside the container vessel in its top region is mounted an annular propane distributor ring or header 27A arranged in a horizontal plane. The header is supplied with water-free liquid make-up propane by propane delivery line 29A, which includes a control valve 99A. The mountings for the header are very diagrammatically indicated by reference numeral 28A and may assume any convenient form. The header is provided on its underside at regularly spaced angular positions with internally screwthreaded openings into which, in the known wax separator, are fitted respective, externally screwthreaded, spray nozzles. However, in the present embodiment, each spray nozzle is replaced by a charge injector 44A which will be described in more detail hereinbelow with reference to FIG. 4. A propane vapor line 42 is connected to the top of each container vessel 13.

Apart from the charge injector 44A, the only other modification incorporated into the batch chiller 24A is that a grid electrode 30A is supported inside spherical container vessel 33 in its bottom region. The grid electrode 30A is connected to earth and completes the electrical circuit of the several charge injectors 44A. Specifically, electrical charge in the waxy oil/propane mixture in the container vessel 33A is collected by electrode 30A and conducted away to earth. Conveniently, the grid electrode is circular in shape, of small thickness and arranged in a horizontal position. Suitably, it can be constructed as a circular grating or gauze for example. The particular form which the grid electrode takes is not of any great significance. Again, the grid electrode is mounted in any appropriate way. For example, it may be supported on an annular internal shoulder 31A on the inside spherical surface of the container vessel 33A. Alternatively, the grid electrode could be vertically orientated, extending to just below or just above the level of the propane/oil mixture in the batch chiller. For a 25 foot diameter container vessel 33A, the level of the mixture in the batch chiller 24A will typically be between about 1 foot above the center-plane of the container vessel and 3 feet above the lowest point in the vessel 33A. In all cases the final level must be sufficiently below the propane header 27A and charge injectors 44A, in order that they can direct or spray propane onto the propane/oil mixture in the container vessel 33A. In another embodiment, a criss-cross arrangement of vertical grids, connected to earth, could be employed, the grids serving to compartmentalize the lower region of the batch chiller interior.

Fill/dump line 25A not only serves to supply propane-diluted waxy oil to the batch chiller 24A, but it also is used for emptying the chiller. For this purpose fill/dump line 25A is connected to a further line 54 which conveys the contents of the batch chiller 24A to a filter feed drum 55 provided at the top with a propane vapor line 47. In order to control the filling and emptying of batch chillers 24A, 24B, control valves need to be used, for example in lines 23, 25A, 25B and 54. In FIG. 3, these valves are shown at 76, 78A, 78B and 77 respectively. The filter feed drum then supplies a slurry of wax particles, lube oil and dissolved propane along line 46 to one or more rotary filters which are not shown. Such rotary filters do not form part of the present invention and need not be further described herein but they are well known in the art. An example of a suitable rotary filter is described in U.S. Pat. No. 4,309,288 (Ryan et al), which is assigned to the present assignees.

Some of the dissolved liquid propane in feed drums 22, 55 and in the batch chillers 24A, 24B vaporizes to form a propane vapor atmosphere in those vessels. Propane vapor from those vessels 22, 55, 24A and 24B is conveyed along lines 26, 47, 42A, 42B, respectively, to a refrigeration unit in a propane handling circuit (not shown) which can be used to supply one or more of the propane requirements of the treatment plant, e.g. the liquid propane feed introduced into the waxy oil feed upstream of the precooler and the feed drum 22 and/or the supply of dry make-up propane to the batch chillers.

Figure 4:
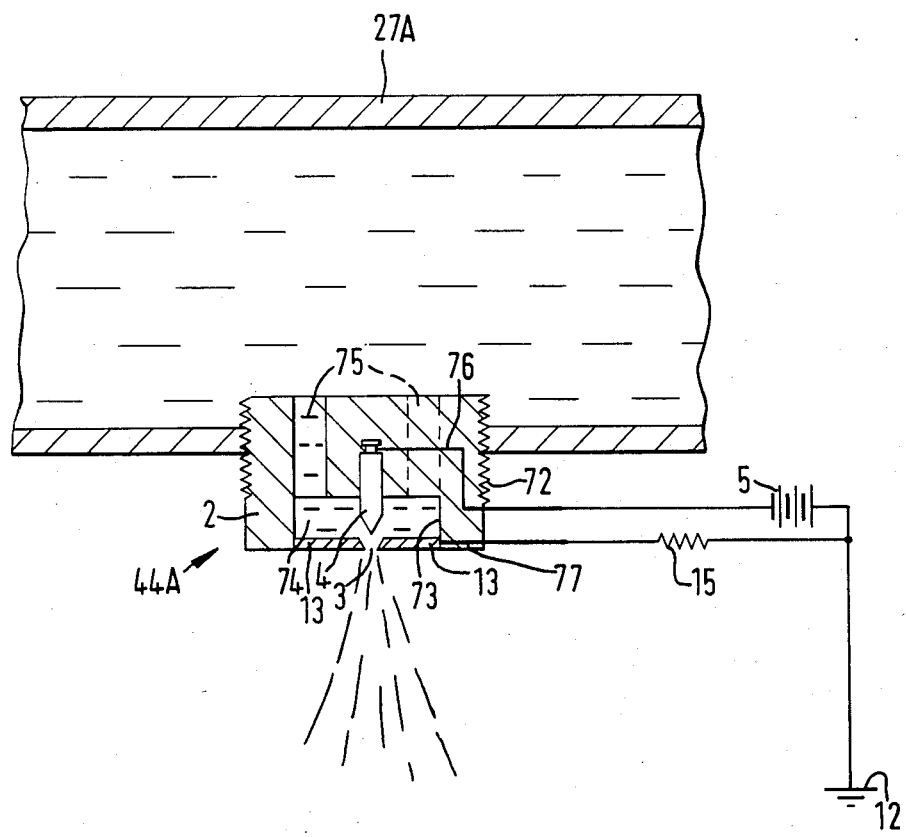
FIG. 4 is a detailed vertical sectional view through a charge injector incorporated in one of the batch chillers shown in FIG. 3.

With reference now to FIG. 4, there is shown a vertical sectional detail through one of the charge injectors 44A mounted in the underside of the ring distributor or header 27A. In this Figure, reference numerals corresponding with those used in FIG. 1 denote the same or corresponding parts and therefore such parts will not be described again, except as concerns different features, where applicable. It will be seen in FIG. 4 that the opening in the header underside in which the charge injector 44 is mounted is internally screwthreaded, for normally receiving the externally screwthreaded propane nozzle of the typical known batch chiller. The charge injector comprises a body 2 of cylindrical shape formed with an externally screwthreaded portion 72 which is interengaged with the internal screwthread of the opening in the header wall underside. The body 2 comprises a cylindrical block of electrically insulative material in which a blind cylindrical recess 73 is formed in the lower region. The bottom wall 13 of the charge injector comprises a circular electrically conductive plate, with a central opening 3, which closes off the blind recess at the bottom to define an enclosed space 74 within charge injector body 2. This enclosed space communicates by means of a plurality of axial passageways 75, drilled in cylindrical block 2, with the inside of header 27. Conductor buses 76, 77 embedded in the material of block 2 are connected at one end to the pointed, high potential electrode 4 and to the plate electrode 13, respectively, and project at their other ends through the side wall of the charge injector body 2 where they are connected by electrical wiring to the negative terminal of high voltage power supply 5 and resistance element 15. Each charge injector 44B in header 27B of batch chiller 24B is identically constructed to charge injector 44A.

The operation of the wax separation plant will now be described. Initially, one batch chiller 24A is empty while a batch of lube oil/propane/wax slurry is being chilled in the other batch chiller 24B. The last batch of chilled lube oil/propane/wax slurry from batch chiller 24A has been transferred to feed tank 55 (for example by means of a pump in line 54, not shown for clarity or by driving the batch out by pressurizing the vapor space in the upper region of batch chiller 24A with propane under pressure delivered by a compressor, also not shown for clarity), valve 99A is closed, the propane headers 27 are inoperative, valves 76, 77 and 78A are all shut, and a quantity of propane-diluted waxy oil is stored in feed tank 22. Then, valve 76 and 78A are opened and propane-diluted waxy oil from tank 22 is conveyed along lines 23 and 25A (for example by means of a pump (not shown) or by pressure and gravity) and enters the batch chiller 24A at the bottom. At the same time, feed tank 22 is replenished with fresh propane-diluted waxy oil through line 21. When an appropriate quantity of the propane/oil mixture has been admitted to the batch chiller 24A, valves 76 and 77A are closed.

The next step in the batch treatment process is to supply dry make-up propane to the header 27A. The propane passes through the charge injectors 44A of the header which inject charge into the propane at a controlled rate or intermittently. The charge injectors direct the charged propane downwardly through the propane vapor space in the batch chiller container vessel 33A and onto the mixture of propane-diluted waxy oil in the vessel where the charged propane mixes with the liquid mixture. At the same time, a proportion of the propane in the container vessel, which is under pressure, is caused to vaporize by gradually releasing pressurized propane vapor through line 42A. This vaporization produces a cooling effect which can be controlled by appropriately controlling the back pressure in the batch chiller and volumetric flow rate of make-up propane supplied to the header 27A, to produce a gradual reducton in the temperature of the batch chiller. As the temperature falls below the cloud point and due to the reduced solubility of the wax in the propane/oil/wax mixture, the dissolved wax starts to crystallize and form a precipitate or suspension in the oil/propane mixture. Furthermore, the electric charge introduced by the charged propane which is directed or sprayed into the batch chiller 24A becomes attached to the formed wax particles and at the same time causes an electric field to be induced in the cooling propane-diluted waxy oil. The electrophoretic effect arising through the interaction between the charged wax particles and the induced electric field causes wax particles to migrate within the oil/propane mixture and unite and grow to form larger wax particles. The process is continued until sufficiently large wax particles and crystals have been grown such that they can easily and effectively be separated from the remaining propane/oil mixture by the rotary filters. Some of the wax particles will adhere to the grid electrode 30A while others will deposit on the inner wall surfaces of the container vessel walls, but most of the wax will remain as a suspension or precipitate in the batch chiller. It will be appreciated that the wax crystal growth is brought about cumulatively by three effects, namely the formation of wax particles due to temperature reduction, the lower solubility of wax in the propane, and the electrophoretic effect produced by the injected charge.

Having completed the batch treatment in batch chiller 24A, the charge injectors 44A are switched off and the supply of propane to the header 27A shut off, and then the valves 78A and 77 are opened and the contents of the batch chiller 24A emptied, via line 25A and line 54, into feed tank 55 while the former contents of feed tank 55 are fed along line 46 to the rotary filters. Before batch chiller 24A is emptied, batch chiller 24B is filled and the above-described chilling cycle is repeated in batch chiller 24B. In each rotary filter, a wax cake is formed on the filter cloth and separated from the propane-diluted oil. The propane-diluted oil leaving the rotary filters is substantially wax-free and is then fed to a propane recovery unit which recovers the dissolved propane leaving lubricating oil which is substantially free of wax and propane.

It has already been remarked that the temperature of the propane/oil mixture entering the batch chillers is kept near the cloud point of the wax. This is because in known batch chillers which do not include any charge injectors, optimum growth of large wax crystals from dissolved wax can only be achieved where the propane/waxy oil temperature is reduced very gradually below the cloud point to promote wax precipitation and gradual cooling is achieved only in the batch chillers. This requirement is not critical with the modified batch chillers because the charge injection compensates for any diminution in wax crystal growth arising through shock chilling. Therefore, less precooling upstream of the feed tank 22 is required and some flashing in feed tank 22 can be tolerated. This results in a reduced chilling load on the batch chillers which can lead to increased plant capacity.

By means of the very simple modification of the known batch chillers by replacing the spray nozzles by charge injectors and installing the grid electrode in the bottom of each batch chiller vessel, much more effective wax particle and crystal growth can be obtained. Therefore, the factors which normally affect crystal size, namely rate of chilling, dilution ratio, dewaxing aid concentration, and level of agitation, all become less critical and this allows substantial operating cost savings. Another advantage is that by using the same refrigeration requirements, the resulting wax particle size will be larger so that simpler downstream rotary filter devices can be used such as drum separators, for example as described in FIG. 2. It is also pointed out that because of the enhanced wax particle growth produced by the charge injection, it is no longer critical to maintain the temperature of the propane-diluted waxy oil near the cloud point before entering the batch chiller, as already mentioned. In addition, dewaxing aids which are often used in batch chiller propane dewaxing are no longer necessary. Nucleating and agglomerating-type dewaxing aids account for approximately 20 to 30% of the controllable operating costs of conventional propane dewaxers, and therefore the incentives for eliminating their need is both large and achievable, using the wax separating plant described with reference to FIGS. 3 and 4.

Figure 5:
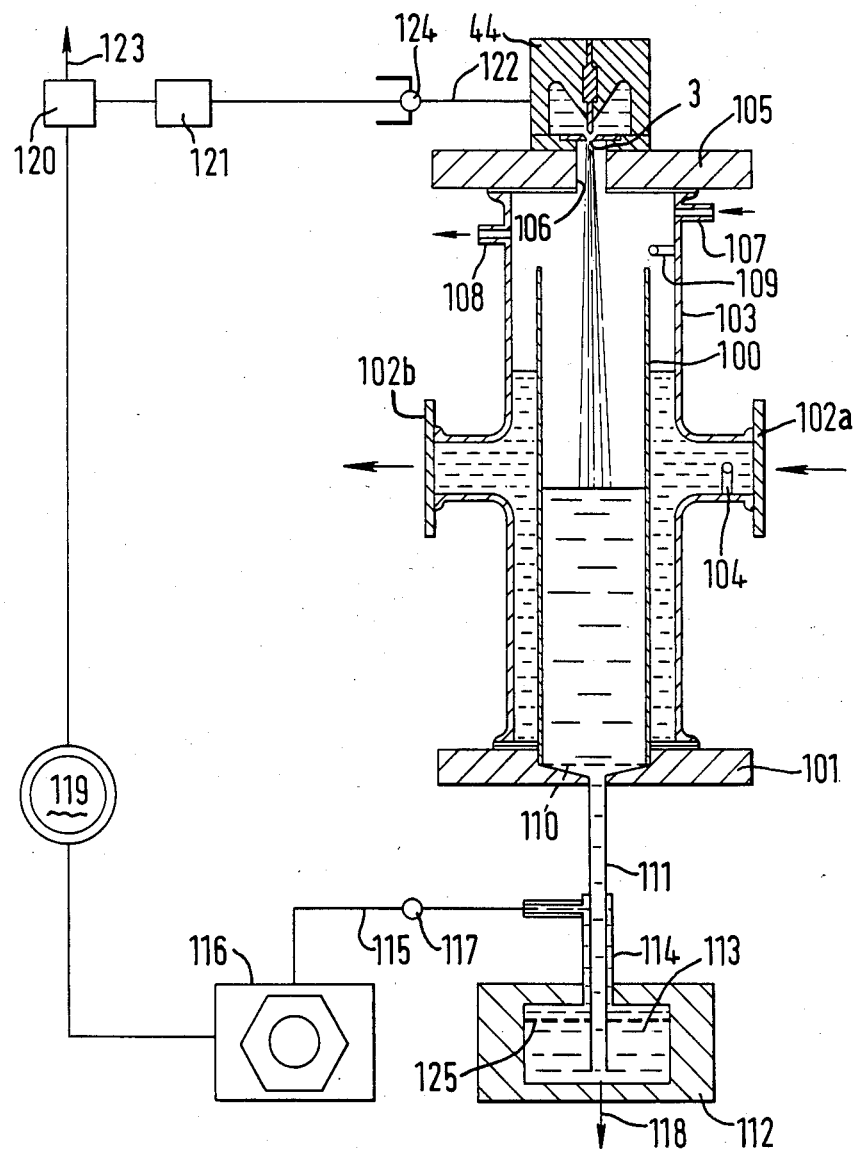
FIG. 5 represents an experimental form of wax separation apparatus.

An experimental wax separation apparatus is shown in FIG. 5 which was used to separate wax from raffinate-hexane mixtures. It comprises an open-topped, upright cylindrical separation vessel 100 supported on a base 101 and surrounded by an upright cooling jacket 103 having a cooling fluid inlet 102a and cooling fluid outlet 102b for circulating a cooling fluid, e.g. water, or, when sub-zero °C. temperatures are maintained, any other suitable refrigerant, through the cooling jacket to maintain the separation vessel at a desired temperature. The bath temperature is monitored by a thermometer device 104 which can be connected in a suitable control system for maintaining the bath temperature at any selected value within a preselected range, which typically might be $-20°$ C. to $+40°$ C. The cooling jacket 103 is closed off at the top by a cover 105 which forms an air-tight seal with the cooling jacket and a charge injector 44, which can be constructed in the same way as the charge injector described above with reference to FIG. 1, is mounted on top of cover 105. A central opening 106 in cover 105 is positioned immediately below the exit orifice 3 of the charge injector so that a downwardly directed stream of charged hexane-diluted raffinate from the charge injector passes through the opening 106 in cover 105 and impinges onto a body of charged raffinate-hexane mixture in the separation vessel. An earthed grid electrode 110, indicated as a horizontal grid but which can take the form of other shapes and configurations, is positioned inside the separation vessel close to its bottom, and completes the electrical circuit of the charge injector.

As shown, the cooling jacket may also be provided with a gas inlet and outlet, 107 and 108 respectively, for purging the enclosed space above the hexane-diluted raffinate in the separation vessel 100 and above the cooling fluid in the cooling jacket 103, so that all traces of air are removed. Gas outlet 108 may be connected to an oxygen analyser which monitors for the presence of air or oxygen in the purge gas exhausted from the enclosed atmosphere in separation vessel 100 and cooling jacket 103. The gas pressure in this enclosed space can be monitored by a pressure gauge, diagrammatically indicated at 109.

A conduit 111 extends downwardly from the bottom of the separation vessel and conveys charged raffinate-hexane mixture from the separation vessel to a settler 112. The settler comprises a setting chamber 113 including a filter screen 125 (for example a 32 mesh metal screen) extending horizontally across the chamber. Samples of the mixture in the settling chamber 113 can be taken, using sample line 118. An outlet pipe 114, arranged coaxially around conduit 111, projects upwardly through the top wall of the settler and is connected by line 115 to a turbidity meter 116 which measures the turbidity of the raffinate-hexane mixture passing through it. A preferred form of turbidity meter is one which optically measures the scattering of incident illumination by the raffinate-hexane mixture from its optical field of view. The temperature of the mixture flowing in line 115 is monitored by temperature sensor 117 and closely corresponds with the temperature in the separation vessel 100.

A constant volume displacement pump 119 pumps raffinate-hexane mixture from the outlet side of the turbidity meter 116 to a gas separator 120 which separates entrained purge gas from the liquid mixture which then passes through a flow rate detector 121 in line 122 which is connected to the inlet of charge injector 44. Purge gas which has been separated from the liquid stream by the gas separator 120 is piped away along line 123 for recycling or discharge. The temperature and pressure of the raffinate-hexane mixture supplied to the charge injector 44 is monitored by temperature and pressure gauges at sampling point 124 in line 122.

In operation, a quantity of preheated raffinate to be treated for wax removal is introduced into the separation vessel, the raffinate being diluted with hexane. The experimental work to be described below was conducted with hexane as the oil-solvent but it will be appreciated that other oil-solvents may be used instead, propane being a preferred diluent.

The pump 119 is then started up and the raffinate-hexane mixture circulates through the separation vessel 100, the settler 112 and back through the charge injector 44. The volumetric flow rate through the apparatus is determined by the pumping action of pump 119. As the liquid mixture flows through the charge injector, charge is injected into it and the charged liquid mixture impinges onto the top of the body of raffinate-hexane mixture in the separation vessel 100 and accumulates there. During this time, the cooling fluid circulating through the cooling jacket maintains the temperature in the separation vessel at a suitable value such that nucleation of dissolved wax and formation of wax particles and crystals starts to take place, assisted by the effect of the injected electric charge. The charge becomes attached to wax particles and crystals suspended in the separation vessel and an electrophoretic migration of wax particles is induced which results in wax particleagglomeration and particle size growth in the separation vessel. The grid electrode 110 is believed to contribute to the wax particle growth and agglomeration by providing a condensation path to earth for the charge on charged wax particles and agglomerates contacting the grid electrode. These particles accordingly lose their charge and therefore will agglomerate more readily with ingrating charged particles encountering those uncharged particles. Some wax becomes deposited on the inner surface regions of the separation vessel or on the grid electrode 110, and some of the growing and agglomerating wax particles are swept out of the separation vessel 100 by the flow of raffinate-hexane liquid leaving the separation vessel at the bottom.

In the settler in which the residence time is comparatively long, grown wax particles start to settle under gravity and precipitate to form a mass of wax or a wax cake on the bottom of the settler. Other grown wax particles are drawn upwardly by the flow of raffinate-hexane mixture leaving the settler at the top and providing they have been grown to a sufficient size to be restrained by the filter screen 125, they are removed from the flow of raffinate-hexane mixture. Any wax particles which are small enough to pass through the filter screen will be recycled through the charge injector 44 and the whole process is continually repeated so that as time passes the proportion of wax in the raffinate-hexane mixture from the settler becomes lower and lower. When the wax content is sufficiently low as determined by the turbidity meter 116, the substantially wax-free raffinate-hexane mixture is discharged from the apparatus, using line 118, and the next batch to be treated is introduced, and so on.

It will of course be recognized that the residence time of the hexane-diluted raffinate in the separation vessel should be sufficiently long that adequate growth in wax particle size for at least a proportion of the wax particles leaving the separation vessel has been achieved such that either the wax particles and agglomerates will separate, by settling, from the raffinate-hexane mixture in the settler 112 or the filter screen 125 can filter the wax particles from the raffinate-hexane mixture. For a given mesh size for the filter screen and for a separation vessel of given dimensions filled to a particular level, the pump delivery will need to be chosen to achieve the desired growth in wax particle size in the separation vessel.

EXAMPLES

Some experimental work which has been conducted to demonstrate the effect of charge injection in lube oil dewaxing will now be described, with reference to FIGS. 6 to 13 of the accompanying drawings.

The experiments were performed using the apparatus depicted in FIG. 5. In all the experiments, a mixture comprising 25% by weight of raffinate and 75% by weight of hexane diluent was used. In each experiment, the raffinate/hexane mixture was introduced into the separation vessel and the bath or cooling jacket temperature as determined by thermometer device 104 was increased until (at a temperature of about 50° C.) the separation vessel temperature as detected by temperature sensor 117 indicated that the raffinate/hexane had reached the required initial temperature of about 40° C. This instant was taken to define the time t=0. The bath temperature was then reduced by circulating the cooling fluid through a refrigerating unit (not shown). The separation vessel temperature did not start to fall until the bath temperature had decreased below the separation vessel temperature. The separation vessel temperature then fell fairly rapidly for a while but the temperature fall rate gradually reduced as the bath temperature approached the temperature of the refrigeration unit.

Immediately prior to starting to reduce the cooling jacket temperature, pump 119 and charge injector 44 were switched on. The charge injector voltage was approximately 60 nano amps at an applied voltage of about 3-4 kV. The flow rate through the charge injector was approximately 1 ml/sec. The numerical values given in the following figures for turbidity are based on arbitrary units but indicate the degree of optical absorptivity of white light by the raffinate/hexane mixture. Turbidity readings were taken at approximately 10 second intervals and the average turbidity values then computed for 1 minute intervals. For each of the experiments, as described below, two sets of data were obtained, one with the charge injector switched off throughout the entire cooling range and the other with the charge injector operating, in order to provide a comparison as between the effect of charge injection and no charge injection under otherwise the same operating conditions. In FIGS. 6 to 13, the data for the case of uncharged raffinate/hexane mixture (no charge injection) is denoted by curve U and for the experiment where the mixture is charged (charge injector operative), the data is presented by curve C.

Figure 6:
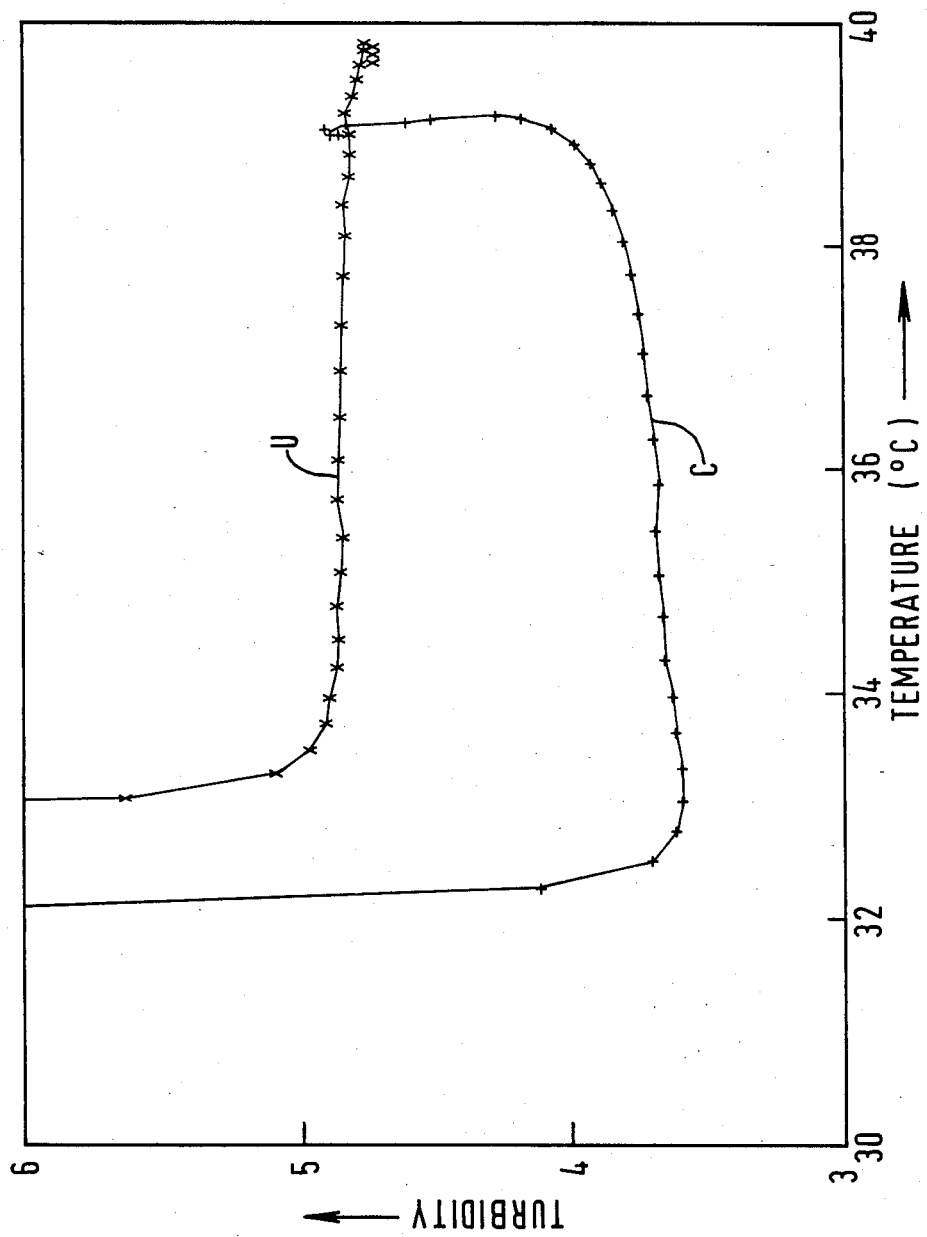
FIGS. 6 and 7 present experimental data, using the apparatus of FIG. 5, but with its settler omitted, illustrating removal of low concentration contaminants, possibly including wax, due to charge injection.

Referring to FIG. 6, this represents the turbidity readings obtained when cooling a sample of raffinate/hexane from an initial temperature of about 40° C. down to about 32° C., in an experiment in which no settler 112 was used and in which conduit 111 was connected directly to the inlet of the turbidity meter 116. In the case where no charge injection was applied, the turbidity data points (curve U), each representing the average of the several readings taken over each 1 minute interval, remained substantially constant (at a value just below 5) until the temperature had fallen to about 33.5° C., following which cooling down to about 33° C. produced a dramatic increase in the turbidity reading. The sharp increase in measured turbidity value was indicative of the onset of wax crystallization.

In the case where charge injection was applied, however (curve C), the turbidity value fell fairly steeply at around 39° C. and then remained relatively constant (between turbidity values of between about 3.5 and 4) until the temperature had fallen to about 32.5° C., whereupon further cooling brought a dramatic rise in the observed turbidity value.

It should be noted that in this experiment, because the settler 112 was omitted from the apparatus, there was no collector surface intentionally provided for the wax crystals and particles being formed in the raffinate/hexane mixture. However, the fall in the turbidity value at the temperature of about 39° C. is believed to be due to the fact that the charge injection was removing microscopic inclusions by deposition on the grid electrode 110, thereby leaving a raffinate/hexane mixture of lower turbidity value.

Figure 7:
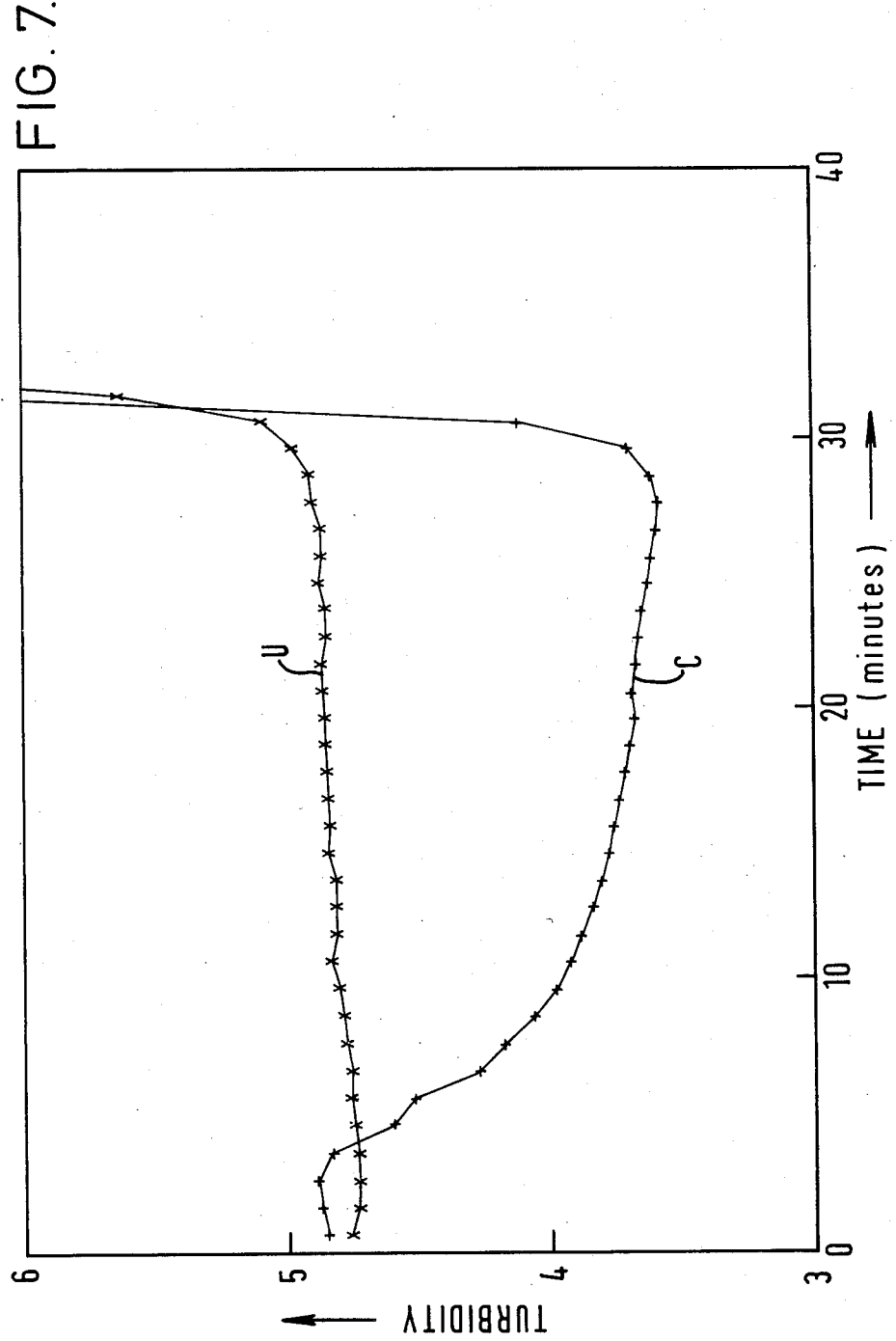

FIG. 7 presents essentially the same data as in FIG. 6 except that turbidity is plotted as a function of time as opposed to temperature. Because as explained above the initial temperature fall of the separation vessel was comparatively small, followed by more rapid cooling and then more gradual cooling again, the observed turbidity value for the first ten minutes or so fell comparatively slowly with time, in the case where the charge injector was operative, as shown in FIG. 7.

Figure 8:
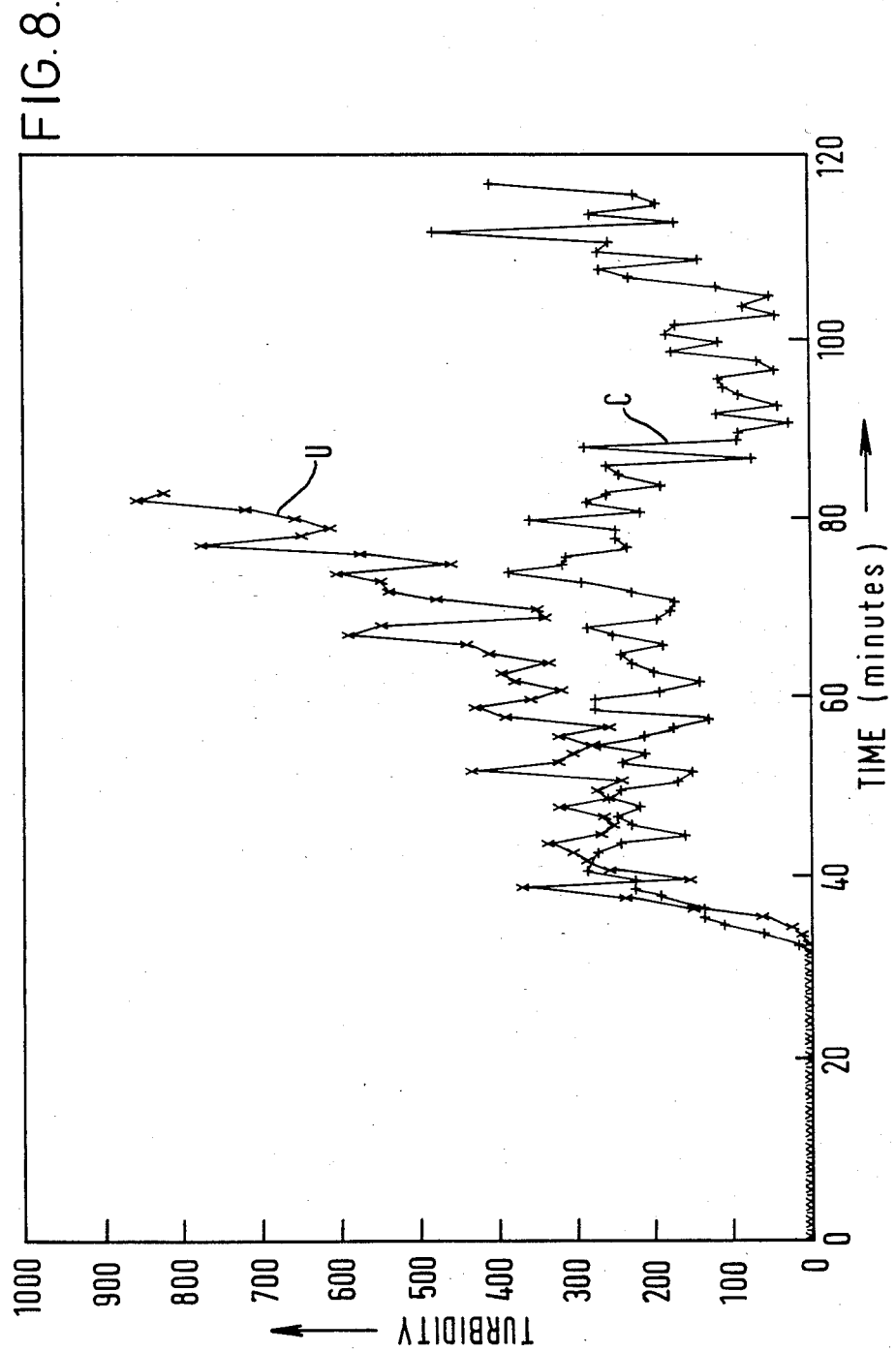
FIGS. 8 to 10 show further experimental data which demonstrate the effect of charge injection on growth and in-situ separation of wax crystals by virtue of the control and lowering of turbidity values as compared with the corresponding case where no charge injection is employed.

FIG 8. presents the same data as FIG. 7, except that the turbidity was measured over a much longer time scale. It should be noted that the turbidity units presented in FIG. 8 are the same as those in FIG. 7 and that is why, on the scale of FIG. 8, the turbidity readings for both the case where charge was injected and charge was not injected appears to be close to 0 until about 30 minutes after the turbidity readings were first taken.

In the case where no charge injection was used, as the temperature of the raffinate/hexane mixture continued to be reduced, a high density of very small wax particles was observed in the raffinate/hexane mixture. The lower the temperature, so lower melting point wax species started to precipitate in the raffinate/hexane mixture, thereby increasing the turbidity value as indicated by the uncharged curve (U) rising with increased time. The sharp peaks and short-term fluctuations observed in the curve are believed to be due to the random distribution of the fine wax particles. At some instants, relatively more wax particles will happen to be in the optical field of view of the turbidity meter whereas at other times a lower density of wax particles will be present. The important feature to notice, however, is the trend towards increasing turbidity with reducing temperature (increasing time).

However, when a further sample was tested in the same way but with the charge injector switched on (curve C), it was observed that much larger wax crystals were formed than in the uncharged case, and the raffinate/hexane mixture was relatively clearer or less cloudy. The turbidity readings over the time span t=30 minutes up to t=120 minutes are consistent with this experimental observation. The turbidity readings fluctuated about a mean value of approximately 200 over this entire time span, as distinct from the rising trend in the case where no charge injection was applied (curve U). This is believed to be due to the fact that the raffinate/hexane mixture, when the charge injector was operating, was observed to be relatively clear. The relatively large peaks and short-term fluctuations in curve C can be explained by inhomogeneities in the number density distribution of wax particles in the field of view of the turbidity meter.

It is remarked that, where charge injection was applied, some deposition of wax crystals on the grid electrode 110 was observed. Such wax deposition may have contributed to the lower observed turbidity values, but it is believed that such contribution was comparatively small because most of the wax crystals were observed to be continually recycled through the apparatus.

Figure 9:
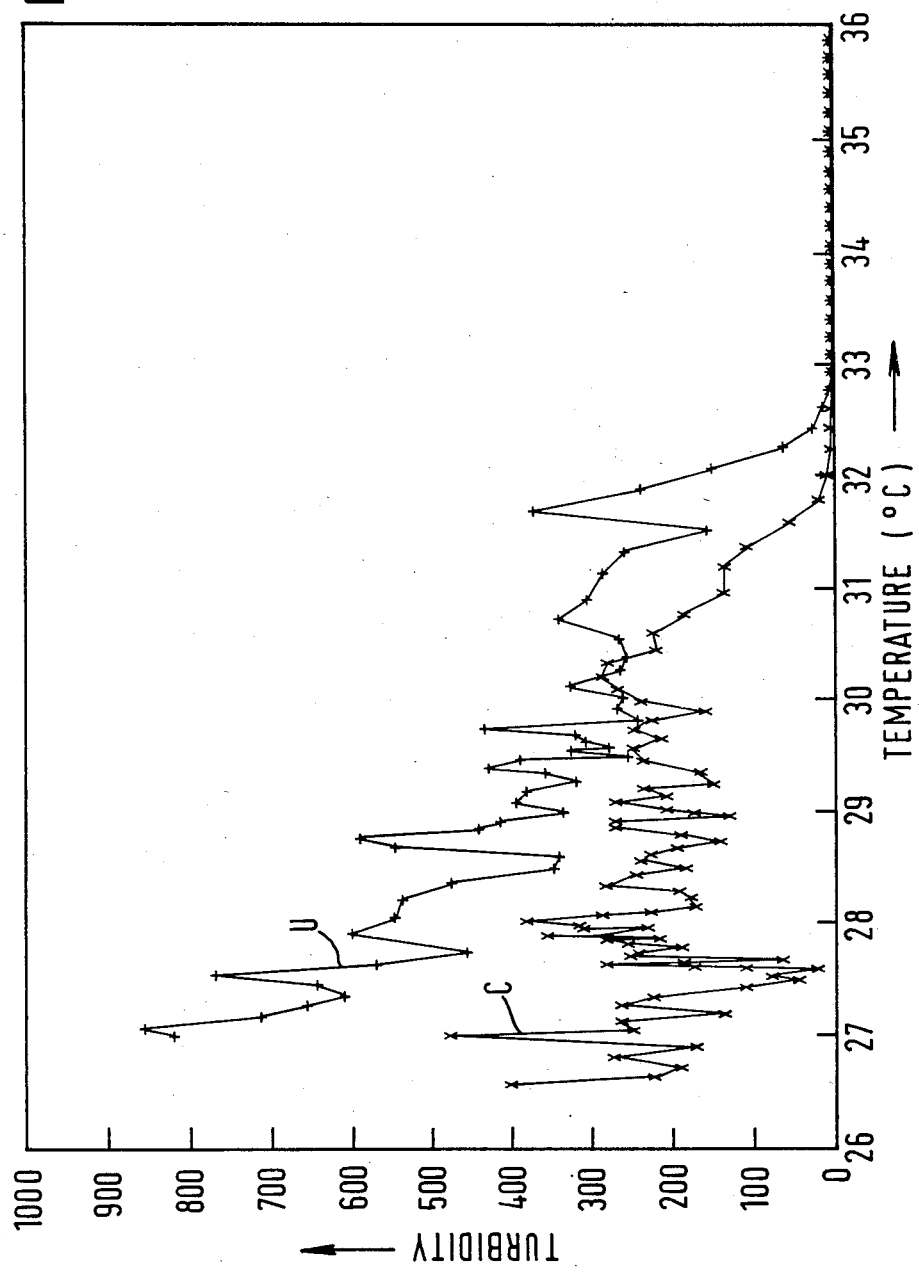

Referring now to FIG. 9, this presents the same data as in FIG. 8, except that turbidity is plotted as a function of separation vessel temperature as opposed to time. The same comments as were made above in connection with FIG. 9 apply equally in the case of FIG. 10.

Figure 10:
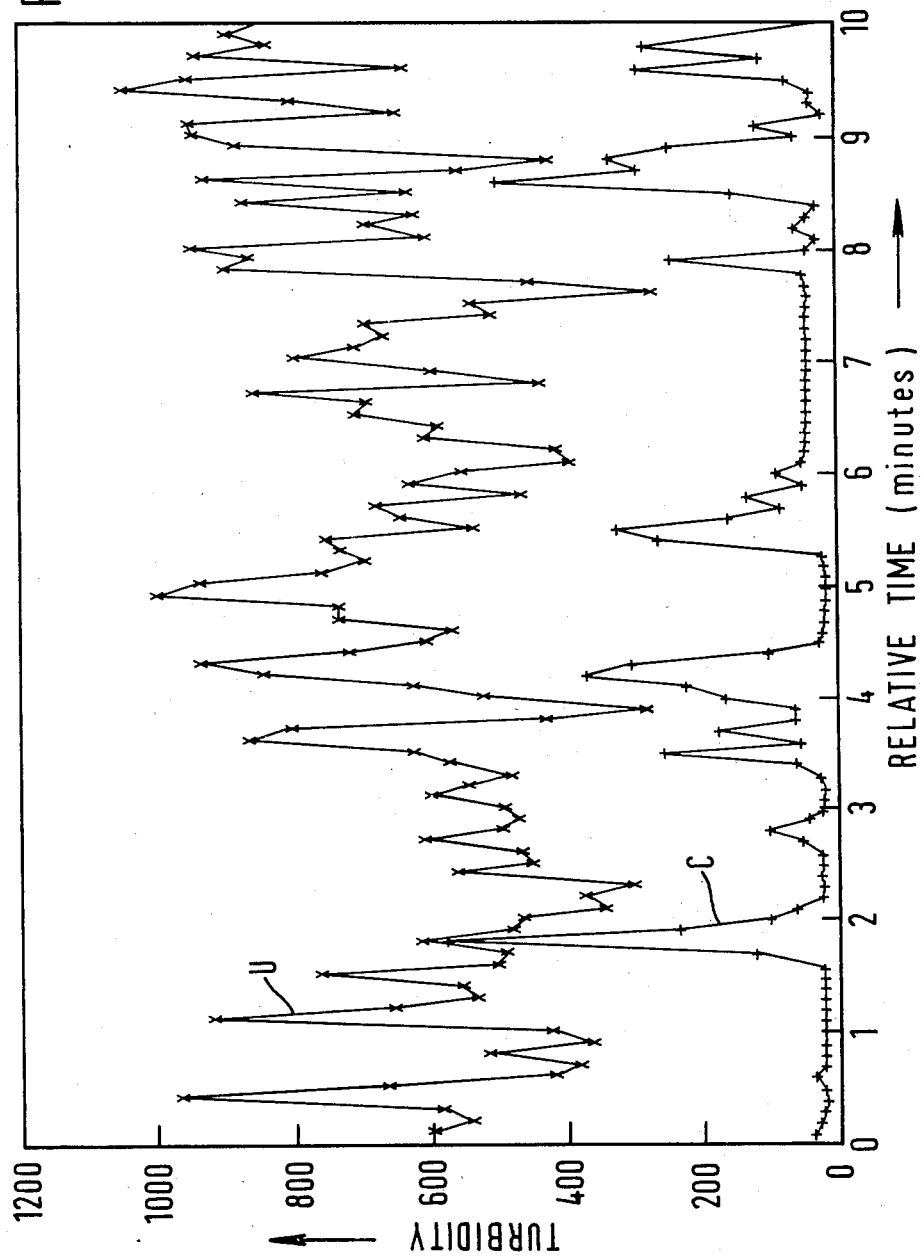
Figure 11:
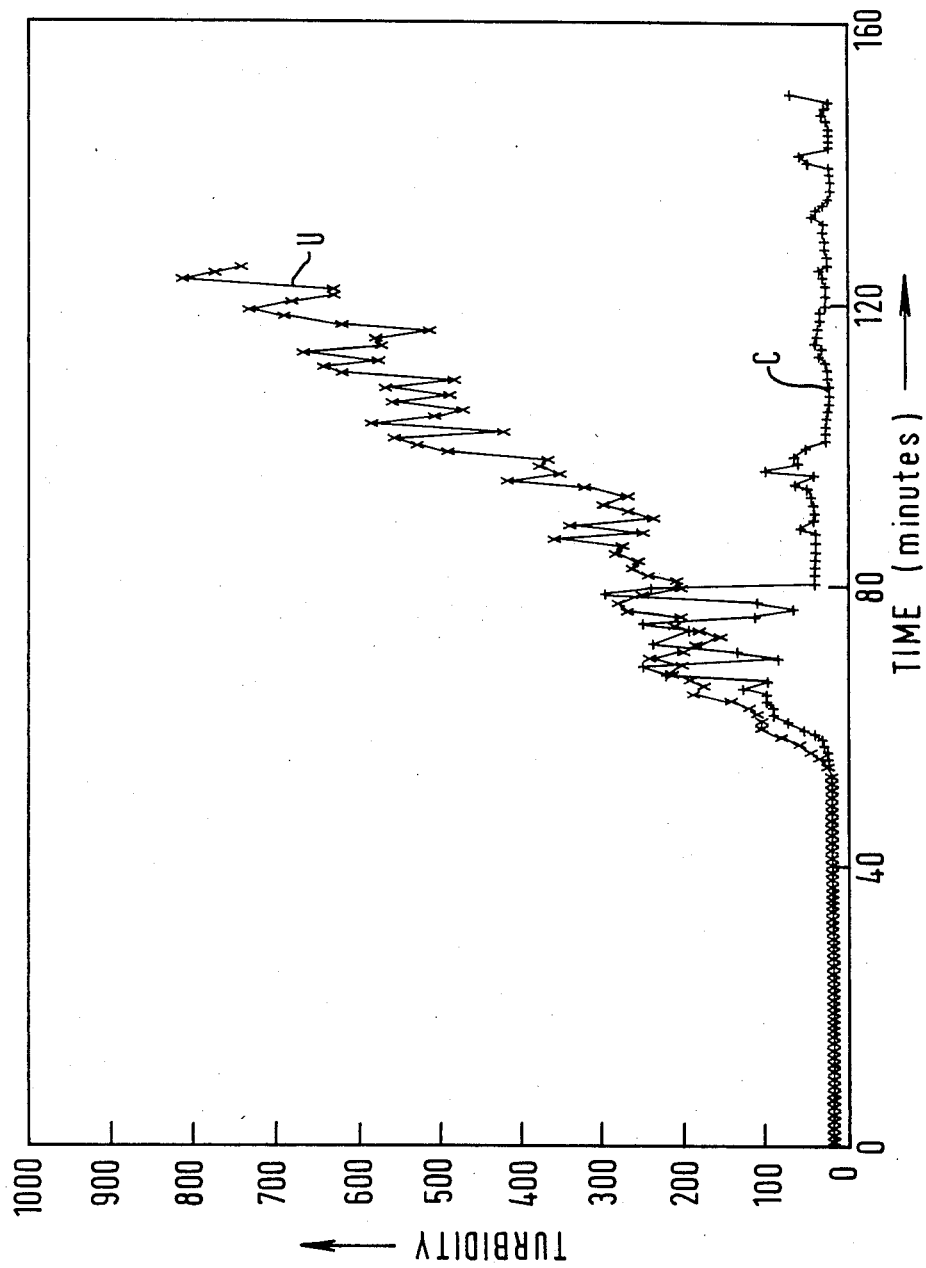
FIGS. 11 to 13 are graphs presenting further experimental data obtained with the apparatus of FIG. 6 (including settler), which shows the ability of a coarse (32 mesh) downstream filter/settler to be effective in removing wax when charge injection is used.

Turning now to FIG. 10, this presents the experimentally determined data for measured turbidity, for the cases of charge injection (C) and no charge injection (U), over a time span of 10 minutes, for which the mean separation vessel temperature was 27.6° C. It was remarked earlier that the data points plotted in FIGS. 6 to 9 were in fact mean values of several readings taken over 1 minute intervals. In FIG. 10, however, average turbidity readings over a 10 sec. time span are plotted. As explained previously, the big fluctuations in the case where no charge injection was applied are believed to be due to the random distribution of fine wax particles in the raffinate/hexane mixture. Similarly, where charge injection was applied, the sharp peaks represent the presence of large wax particles in the optical field of the turbidity meter. What, however, is of interest in FIG. 10 is that, apart from the presence of the sharp peaks, the measured turbidity value is almost uniform and also remarkably low (about 20 to 40 units). This uniform low value is believed to represent the turbidity of clarified raffinate/hexane mixture (substantially wax-free) without any wax particles being present in the field of view of the turbidity meter at the time that the readings concerned were taken. If any of the raffinate/hexane mixture examined were to have contained large numbers of small wax crystals in addition to the large wax crystals which were observed, then one would not have expected the observed turbidity value between peaks to have been either so low in value or of almost uniform magnitude. The implication, therefore, is that all the wax particles originally produced, of all sizes, were grown to form large wax crystals leaving substantially no small ones remaining.

Additional experiments were then run, this time with the settler 112 connected up as shown in FIG. 5 between the separation vessel 100 and the turbidity meter 116. With the charge injector inoperative, little wax was collected by filter screen 125 and the measured turbidity value was observed to rise with increasing time, as shown by curve U in FIG. 11. In particular, the data curve U in FIG. 12 corresponds fairly closely with the corresponding curve in FIG. 8, thereby indicating that the settler 112 is largely ineffective in the absence of injected charge. However, when the experiment was repeated with the charge injector switched on, wax crystals were observed to be restrained by the filter screen 125. Furthermore, the raffinate/hexane mixture was observed to become relatively clear during the experiment and this observation is wholly consistent with the measured turbidity over the entire time span of the experiment. The observed turbidity value from t=80 minutes to about t=150 minutes was very much lower than the corresponding data presented in FIG. 8 where no settler was used. It is interesting that in FIG. 11, between about t=55 minutes and t=80 minutes, the measured turbidity showed an increasing trend before falling significantly at about t=80 minutes, whereafter it remained at a comparatively low and constant value for the remainder of the experiment. Possibly, this rise is due to the formation and growth of wax crystals during that time but it was not until at time t=80 minutes that the wax crystals were big enough to be restrained by the filter screen 125.

Figure 12:
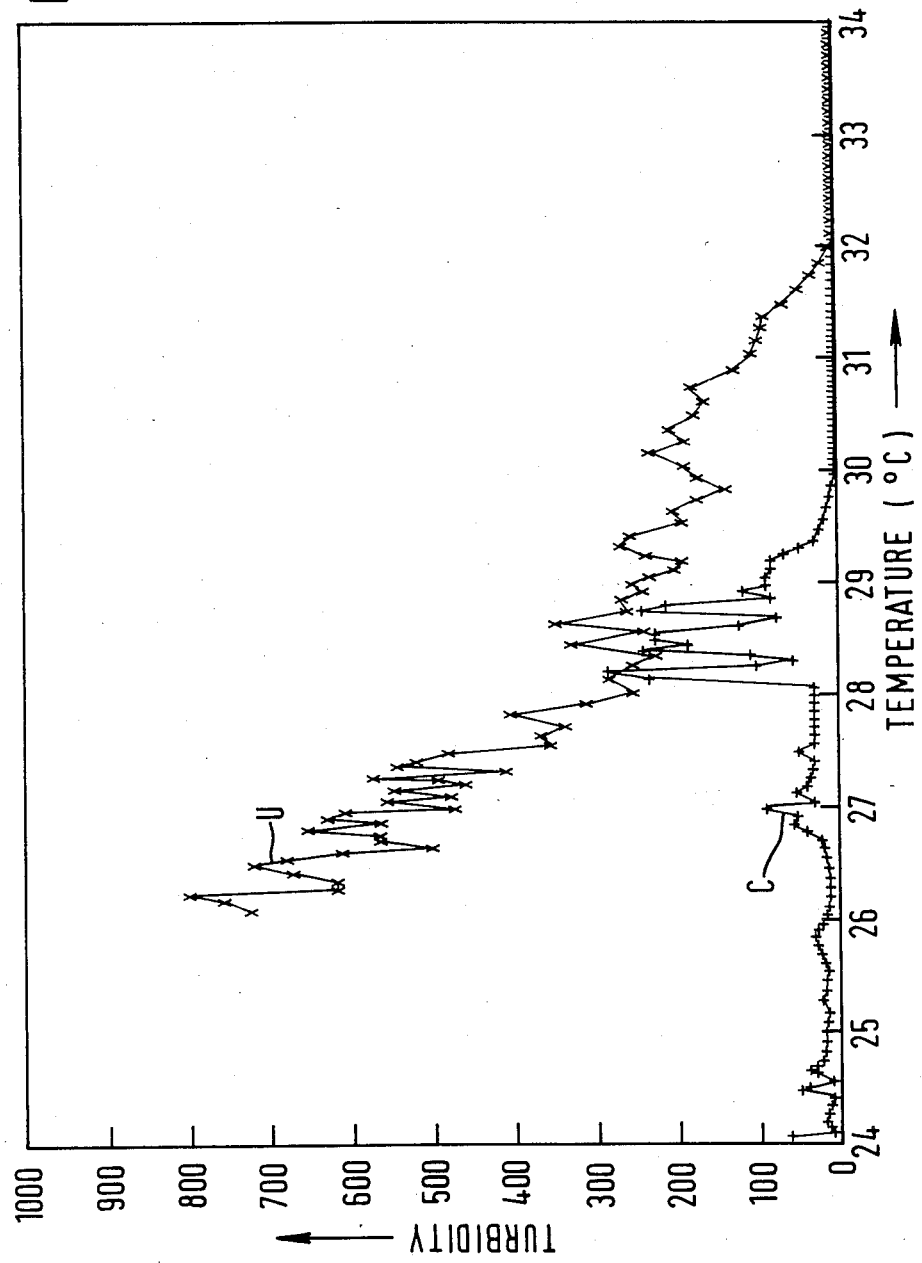
Figure 13:
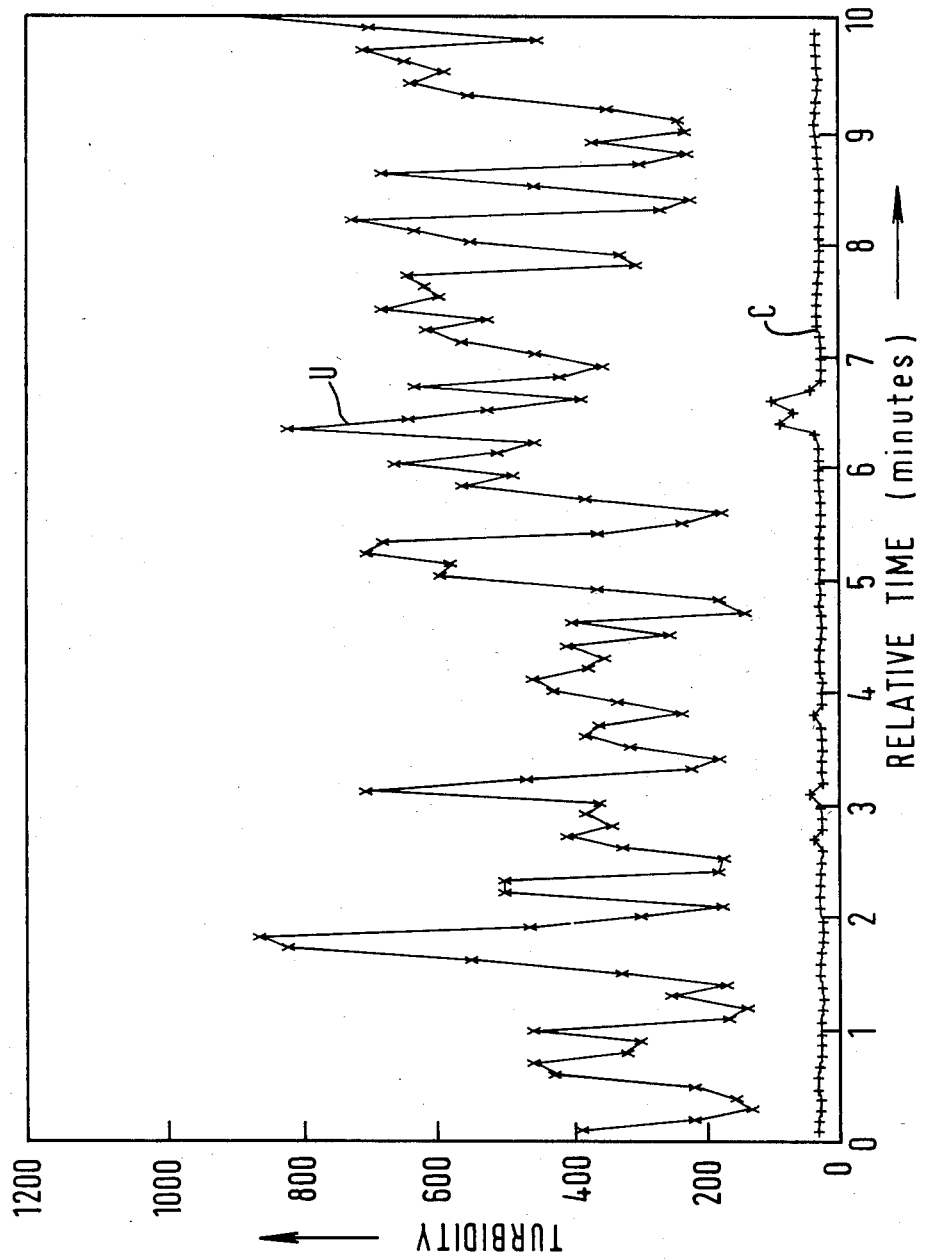
Figure 14:
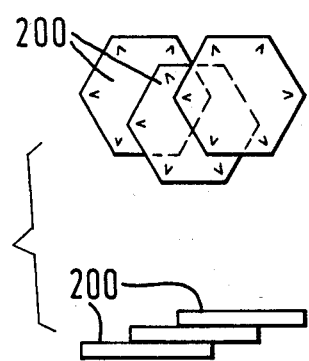
FIGS. 14 and 15 illustrate the crystal morphologies resulting from progressively cooling a lube oil/hexane mixture, initially containing dissolved wax, down to room temperature in the cases where there was no charge injection and where charge injection was effected throughout the cooling, respectively.
Figure 15:
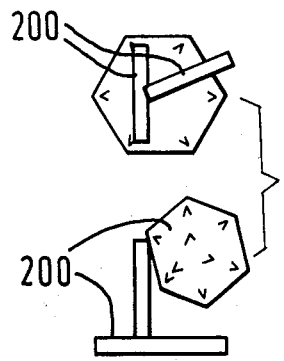

The data presented in FIGS. 12 and 13 correspond with that in FIGS. 9 and 10, respectively, except that for FIGS. 12 and 13, the settler 112 was used in the apparatus of FIG. 5. Corresponding comments to those made in connection with the data of FIG. 11 apply in the case of FIGS. 12 and 13 and therefore will not now be repeated. The important conclusion is that FIGS. 12 and 13 further illustrate how the filter screen 125 of the settler 112 is able to remove substantially all of the wax particles which have been grown by the charge injection process in the presence of hexane solvent. In particular, FIG. 10 indicates that no large wax particles were within the field of view of the turbidity meter.

In a further experiment, a waxy lube oil/hexane mixture was cooled from an initial temperature of about 40° C., at which substantially the entire wax content of the lube oil was present as dissolved wax, down to an ambient temperature of about 25° C., causing dissolved wax to nucleate and precipitate as wax crystals, taking the form of hexagonal-shaped platelets. No charge was injected into the oil hexane mixture during the cooling. The resulting wax crystals were observed under a microscope and their configuration is depicted in the two views of FIG. 12, the upper view representing a plan view of the crystal platelets, designated 200, and the lower view being a side view. FIG. 12 shows that the wax crystals were observed to form groups of united hexagonal flat-plates which were stacked face-to-face. When a lube oil containing such wax particles is passed through a filter cloth, poor filtration is obtained due to the wax crystals clogging the fine openings in the filter cloth. This is believed to be due to the relatively "two-dimensional" shape of the individual groups of united wax crystals.

The experiment was repeated with charge injected continuously into an identical lube oil/hexane mixture over the entire cooling range ($\sim$40° C. to $\sim$25° C.). The charge injector maintained a mean charge density in the lube oil/solvent mixture of about 0.01 Coulombs per cubic meter. The final wax crystals 200 were again observed to be hexagonal, flat platelets, but in this case the platelets 200 were observed to tend to grow or unite directly in edge-to-face manner, as shown in FIG. 13. The inventors believe that this may result from charge induced alignment of crystals prior to collisional growth or prior to fusion of adjacent crystals or by charge inducing a preferential growth outward from a crystal face rather than a crystal edge. The resulting three-dimensional shape will improve filtration by avoiding blockage of the filter openings. Furthermore, any subsequent washing of the filter cake on the filter cloth will be enhanced by the open structure of the wax crystal network.

It should be understood that the foregoing disclosure and description are only illustrative and explanatory of the invention. Various changes in and modifications to the components of the inventive apparatus and methods, as well as in the details of the illustrated apparatus and of the disclosed processes, may be made within the scope of the appended claims without departing from the spirit of the invention.

Finally, reference is hereby directed to co-pending U.S. patent application Ser. Nos. 722,107, 722,162 and 722,163 assigned to the present assignees, for respective disclosures of similar subject matter to the present invention.

What is claimed is:

1. A method of pretreating a hydrocarbon oil mixture boiling in the lubricating oil range and containing dissolved wax, comprising the steps of reducing the solubility for the wax so as to cause dissolved wax in the oil to form a dispersion of wax particles in the oil mixture and introducing free excess charge which is net unipolar into the oil mixture, whereby wax particle agglomeration and particle size growth occurs.

2. A method as claimed in claim 1, wherein the solubility of the wax is altered by cooling the oil mixture to cause dissolved wax to solidify to form said dispersion of wax particles.

3. A method as claimed in claim 2, wherein an oil solvent liquid is added to the oil mixture to promote precipitation of dissolved wax as wax particles.

4. A method as claimed in claim 3, wherein said oil solvent liquid is an alkane with molecular weight between 16 and 114.

5. A method as claimed in claim 3, wherein said oil solvent, liquid is an alkene with molecular weight between 16 and 114.

6. A method as claimed in claim 3, wherein said oil solvent liquid has electrical conductivity less than $10^{-8}$ (ohm-meter)$^{-1}$.

7. A method as claimed in claim 2, wherein said oil solvent liquid is an auto-refrigerant liquid which at least partially vaporizes so as to reduce the temperature of the oil mixture.

8. A method as claimed in claim 3, wherein said auto-refrigerant liquid is liquid propane.

9. A method as claimed in claim 3, wherein the oil mixture is cooled by heat exchange with a cooling fluid medium.

10. A method as claimed in claim 1, wherein wax particle agglomeration and particle size growth are allowed to occur for a sufficient time such that on passing the wax particle-laden oil mixture through a filter medium, substantially all of the wax particles will be restrained by the filter medium.

11. A method as claimed in claim 1, wherein the pretreated wax-containing oil mixture and a collector surface are brought into contact with one another so that wax particles deposit on said collector surface, for separation from the oil mixture.

12. A method as claimed in claim 1 for batch pretreatment of the oil mixture, wherein free excess charge which is net unipolar is introduced into a stream of oil solvent liquid which is directed onto a quantity of oil mixture in a separation vessel, said charged liquid having a boiling point such that it vaporizes in the separation vessel for gradually cooling the quantity of oil mixture in the separaton vessel.

13. A method as claimed in claim 1, wherein a liquid additive is added to the oil mixture to form an admixture, said liquid additive being such as to preferentially combine, physically or chemically, with the dissolved wax while providing an affinity for free excess charge.

14. A method as claimed in claim 13, wherein said liquid additive comprises a high molecular weight hydrocarbon containing an amine group.

15. A method as claimed in claim 1, wherein a first oil solvent liquid is added to the waxy oil mixture to form an admixture, the admixture is cooled to the cloud point of the admixture in the absence of any introduced free excess charge, and then a second oil solvent liquid is added to said admixture, said second oil solvent liquid having a lower solubility for wax than for said admixture, so as to cause the wax to precipitate as wax particles, and the free excess charge is introduced into the admixture of waxy oil mixture and first and second oil solvents, to bring about agglomeration and growth of the precipitated wax particles.

16. A method as claimed in claim 1, wherein charge is removed form charged wax particles encountering a grid electrode, such removal being effected by a conductive path between the grid and earth.

17. A method as claimed in claim 1, wherein the free excess charge is introduced by field emission into the hydrocarbon oil mixture and the charged oil mixture is directed as a stream or spray through a gas or vapor space into a body of charged oil mixture in which said wax particle agglomeration and particle size growth occur, said gas or vapor space serving to reduce or minimise charge dissipation from said body of charged oil mixture back to where the free charge introduction took place.

18. A method of separating dissolved wax from a hydrocarbon oil mixture boiling in the lubricating oil range, which comprises the steps of reducing the solubility for the wax so as to cause dissolved wax in the oil mixture to form a dispersion of wax particles and introducing free excess charge which is net unipolar into the oil mixture, and which method further comprises bringing the charged oil mixture and a collector surface into contact with one another so that charged wax particles in the oil mixture collect on the collector surface under the effect of the introduced free excess charge.

19. A method as claimed in claim 18, wherein the solubility of the wax is altered by cooling the oil mixture to cause dissolved wax to solidify to form said dispersion of wax particles.

20. A method as claimed in claim 19, wherein an auto-refrigerant liquid is added to the oil mixture, which auto-refrigerant liquid at least partially vaporizes to cool the oil mixture.

21. A method as claimed in claim 20, wherein the waxy oil mixture is precooled in a heat exchanger after said auto-refrigerant liquid is added but before it vaporizes.

22. A method as claimed in claim 20, wherein said auto-refrigerant liquid is an oil-solvent liquid.

23. A method as claimed in claim 20, wherein the free excess charge is directly introduced into the waxy oil mixture after the auto-refrigerant liquid is added.

24. A method as claimed in claim 20, wherein said auto-refrigerant liquid is added to the waxy oil mixture and at least partially vaporized, whereafter the free excess charge is introduced into the waxy oil mixture.

25. A method as claimed in claim 20, wherein the free excess charge is indirectly introduced into the waxy oil mixture by being introduced directly into the auto-refrigerant liquid before that liquid is added to the waxy oil mixture.

26. A method as claimed in claim 19, wherein the free excess charge is introduced into the waxy oil mixture by charge injection.

27. A method as claimed in claim 19, wherein an oil solvent liquid is added to the wax-containing oil before it is cooled.

28. A method as claimed in claim 27, wherein the oil solvent liquid is a vaporizable liquid and the cooling is brought about by first precooling the mixture of wax-containing oil mixture and oil solvent by indirect heat exchange with a refrigerant and secondly flashing the pre-cooled mixture in a flash drum to reduce the temperature of said mixture.

29. A method as claimed in claim 18, wherein the free excess charge is introduced by field emission into the hydrocarbon oil mixture and the charged oil mixture is directed as a stream or spray through a gas or vapor space into a body of charged oil mixture which is in contact with said collector surface, said gas or vapor space serving to reduce or minimise charge dissipation from said body of charged oil mixture back to where the free charge introduction took place.

30. A method for the continuous separation of wax from a hydrocarbon oil mixture feedstock boiling in the lubricating oil range, which comprises subjecting the oil mixture feedstock to the successive steps of adding liquid propane to the wax-containing oil mixture, flashing the propane-diluted oil mixture in a flash drum to reduce the temperature of the oil mixture to cause dissolved wax to solidify to form wax particles dispersed in the lubricating oil, injecting net unipolar electric charge into the wax-containing oil, brining the charged propane-diluted oil mixture into contact with a collector surface so that wax particles in the oil mixture migrate to and collect on said collector surface under the effect of the injected charge, and removing the collector surface, together with the collected wax, from contact with the oil mixture.

31. A method as claimed in claim 30, wherein the charged wax-containing oil mixture is fed into a trough, a collector drum which is positioned coaxially relative to the trough and whose outer circumferential surface provides said collector surface is continuously rotated so that part of said collector surface is passing through said trough while the remainder of said collector surface is making a return pass above the trough, and wax collected on the drum outer surface is removed from that part of said collector surface which is making a return pass.

32. A method as claimed in claim 30 wherein the wax collected on the drum is removed by being scraped from the drum by a stationary scraper.

33. A method as claimed in claim 30, wherein the cooled wax-containing oil mixture is split into two streams, the net unipolar charge is injected into only one of the streams, and the two streams are separately diverted into said trough, at least the charged stream being directed through a gas or vapor space.

34. A method as claimed in claim 30, wherein the propane-diluted wax-containing oil mixture is pre-cooled by indirect heat exchange with a refrigerant before entering the flash drum.

35. A method of separating dissolved wax from a hydrocarbon oil mixture boiling in the lubricating oil range, which comprises the steps of:
(1) reducing the solubility for the wax so as to cause dissolved wax in the oil mixture to form a dispersion of wax particles,
(2) introducing free charge that is net unipolar into the oil mixture, at least predominantly by electron emission which causes the oil mixture to act as a medium through which volumetric distribution of the introduced charge takes place,
(3) passing the charged oil mixture into a wax particle agglomeration region containing a body of charged oil mixture, there being a sufficient excess of free charge introduced such that the volumetric charge distribution causes, in said wax particle agglomeration region, an electric field to be induced in said body of charged oil mixture and the wax particles to become charged, and the induced electric field and the charge on the wax particles interact to produce an electrical driving force acting on the wax particles, said electrical driving force producing migration of wax particles within said body of oil mixture with resulting wax particle agglomeration, and
(4) collecting such agglomerated wax particles so as to leave substantially wax-free oil mixture.

36. A method as claimed in claim 35, wherein the free charge is introduced into a stream of said oil mixture, at least predominantly by field emission, and the charged stream is passed through a gas or vapor space, before entering said wax particle agglomeration region, for minimising charge dissipation from said body of charged oil mixture in the wax particle agglomeration region back to where the free charge introduction took place.

37. A method as claimed in claim 35, wherein the free charge is introduced without producing ionic dissociation within the oil mixture.

38. A method as claimed in claim 36, wherein said agglomerated wax particles are collected on the exposed surfaces of a bed of densely packed collector elements of low electrical conductivity disposed within said body of charged oil mixture.

39. A method as claimed in claim 36, wherein said body of charged oil mixture is maintained so as to allow sufficient wax particle agglomeration to occur such that on discharging that oil mixture from said wax particle agglomeration region through a filter device, the agglomerated wax particles are separated by the filter device from the oil mixture.

40. Apparatus for separating dissolved wax from a hydrocarbon oil mixture boiling in the lubricating oil range, comprising means for reducing the solubility for the wax so as to cause dissolved wax in the oil mixture to form a dispersion of wax particles, means for introducing free charge which is net unipolar into the waxy oil mixture in such manner as to cause the oil mixture to act as a medium through which volumetric distribution of the introduced charge takes place, and separator means for receiving charged waxy oil mixture from the free charge introducing means and for separating wax from the charged oil mixture by producing migration of wax particles within the oil mixture, the separator means comprising a vessel for containing a body of charged waxy oil mixture, the charge introducing means being arranged to introduce a sufficient excess of free charge such that the volumetric charge distribution causes, in said vessel, an electric field to be induced in the oil mixture and the wax particles to become charged, and the induced electric field and the charge on the wax particles interact to produce an electrical driving force acting on the wax particles so that said migration is due substantially to said driving force and said migration causes wax particle agglomeration to occur within said body of oil mixture, the separator means further comprising a wax collector for collecting such agglomerated wax particles, so as to leave substantially wax-free oil mixture in the separator means.

41. Apparatus as claimed in claim 40, wherein the solubility reducing means comprises means for cooling the oil mixture.

42. Apparatus according to claim 41, further comprising means for adding an oil solvent liquid to the oil mixture to promote precipitation of dissolved wax as wax particles.

43. Apparatus according to claim 40, wherein the oil mixture cooling means comprises means for adding an auto-refrigerant liquid to the oil mixture, said auto-refrigeratnt liquid at least partially vaporizing so as to reduce the temperature of the oil mixture.

44. Apparatus according to claim 41, wherein the oil mixture cooling means comprises a heat exchanger providing heat exchange between the oil mixture and a cooling fluid medium.

45. Apparatus as claimed in claim 40, wherein the free charge introducing means comprises a charge injector arranged to inject free charge, at least predominantly by field emission, into the oil mixture, and wherein the charge injector is mounted above and spaced from, said body of oil mixture in said vessel and arranged to direct charged oil mixture as a stream or spray onto the surface of said body of oil mixture, for minimising charge dissipation from the body of oil mixture in said vessel back to the charge injector.

46. Apparatus as claimed in claim 45, wherein said wax collector comprises a bed of densely packed elements of low electrical conductivity arranged inside said vessel.

47. Apparatus as claimed in claim 45, wherein said vessel comprises a trough and said wax collector comprises a rotary collector drum, having an outer cylindrical wax collecting surface and arranged with part of its wax collecting surface submerged in, and with the remaining part of its wax collecting surface positioned above, said body of oil mixture in said trough, means arranged to rotate the drum about its axis, and means for removing wax, carried by said remaining part of its wax collecting surface, from the collector drum.

48. Apparatus as claimed in claim 45, wherein said wax collector comprises a filter device and said vessel comprises a batch chiller provided with means operable for periodically discharging a batch of chilled oil mixture from said chiller and through said filter device which is arranged to separate agglomerated wax particles from the oil mixture.

49. Apparatus as claimed in claim 45, wherein said vessel comprises an inlet at a top end thereof for admitting said stream or spray of charged oil mixture into said vessel and an outlet at a bottom end thereof for discharging oil mixture from said vessel, wherein said wax collector comprises a settler for oil mixture discharged from said vessel, said settler including a filter screen for restraining agglomerated wax particles from oil mixture passing through the filter screen, and wherein means are provided for recycling oil mixture which has passed through the filter screen of the settler back to the inlet of the charge injector so as to be admitted to the vessel again as a charged spray or stream.

50. Apparatus for pretreatment of a hydrocarbon oil mixture boiling in the lubricating oil range, and containing dissolved wax, comprising means for reducing the solubility for the wax so as to cause dissolved wax in the oil mixture to form a dispersion of wax particles in the oil mixture, means for introducing free excess charge which is net unipolar into the oil mixture, a separation vessel and means for at least partially filling and emptying the separation vessel with charged oil mixture from the free charge introducing means, in such manner that the charged oil mixture has a sufficiently long residence time in the separation vessel to produce wax particle agglomeraton and particle size growth in the oil mixture in the separation vessel, such that on passing the wax particle-laden oil mixture through a filter medium, substantially all the wax particles will be restrained by the filter medium.

51. Apparatus as claimed in claim 50, further comprising a grounded grid electrode arranged inside the separation vessel in electrical contact with charged oil mixture in the separation vessel, for providing a conduction path to earth for charge on charged wax particles coming into contact with said grid electrode.

52. Apparatus for pretreatment of a hydrocarbon oil mixture boiling in the lubricating oil range, and containing dissolved wax, comprising means for adding an auto-refrigerant liquid to the oil mixture, said auto-refrigerant liquid at least partially vaporizing so as to reduce the temperature of the oil mixture, thereby to cause dissolved wax in the oil mixture to form a dispersion of wax particles in the oil mixture, means for introducing free excess charge which is net unipolar into the oil mixture, a separation vessel for receiving a quantity of charged oil mixture from the free charge introducing means, means for removing vaporized auto-refrigerant liquid from the vessel, and a header positioned inside the vessel for issuing make-up auto-refrigerant liquid downwardly onto said quantity of oil mixture, the means for introducing free excess charge comprises a plurality of charge injectors in the header, arranged to inject charge into the auto-refrigerant liquid issued by the header, whereby the charge transfers to the oil mixture in the separation vessel.

53. Apparatus for separating dissolved wax from a hydrocarbon oil mixture boiling in the lubricating oil range, comprising means for reducing the solubility for the wax so as to cause dissolved wax in the oil mixture to form a dispersion of wax particles, means for introducing free excess charge which is net unipolar into the waxy oil mixture, and a collector surface arranged for contact with the charged waxy oil mixture so that charged wax particles in the oil collect on the collector surface under the effect of the introduced free excess charge, the solubility reducing means comprising means for cooling the oil mixture including means for combining an auto-refrigerant liquid with the waxy oil mixture, said auto-refrigerant liquid being such as to at least partially vaporize so as to cool the oil mixture, said charge introducing means comprising a charge injector for introducing free excess charge into the auto-refrigerant liquid before that liquid is added to the waxy oil.

54. Apparatus for separating dissolved wax from a hydrocarbon oil mixture feedstock boiling in the lubricating oil range, comprising means for cooling the wax-containing oil mixture feedstock to a temperature at which dissolved wax forms a dispersion of wax particles in the oil mixture, a charge injector for introducing free excess charge which is net unipolar into the cooled wax-containing oil mixture, and separator means, including a wax collector surface, for bringing the charged wax-containing oil mixture and said collector surface into contact with one another so that wax in the oil migrates to and collects on said collector surface under the effect of the introduced free excess charge, there being means, including a bypass line, provided for causing part of the cooled wax-containing oil for the cooling means to bypass the charge injector and then for recombining, in the separator means, that uncharged wax-containing oil mixture with the charged wax-containing oil mixture from the charge injector.

55. Apparatus for separating dissolved wax from a hydrocarbon oil mixture feedstock boiling in the lubricating oil range, comprising means for cooling the wax-containing oil mixture feedstock to a temperature at which dissolved wax forms a dispersion of wax particles in the oil mixture, means for introducing free excess charge which is net unipolar into the cooled wax-containing oil mixture, and separator means, including a wax collector surface, for bringing the charged wax-containing oil mixture and said collector surface into contact with one another so that wax in the oil migrates to and collects on said collector surface under the effect of the introduced free excess charge, the separator means comprising a rotary collector drum, whose outer cylindrical surface provides said wax collector surface, means arranged to rotate the drum about a substantially horizontal axis, and means for maintaining a quantity of charged wax-containing oil mixture in contact with the outer cylindrical surface of the collector drum, so as to cause wax particles to collect and deposit on the dum collector surface while the drum rotates, due to the electrophoretic migration of the wax particles caused by the introduced electric charge, and be separated by the rotating drum from said quantity of charged oil mixture.

56. Apparatus as claimed in claim 55, wherein said means for maintaining a quantity of charged wax-containing oil mixture in contact with the outer cylindrical surface of the collector drum comprises a trough inside which said rotary collector drum is positioned with its wax collector surface partially submerged in the charged oil mixture in the trough.

* * * * *